US012670404B2

(12) United States Patent

Passban et al.

(10) Patent No.: US 12,670,404 B2

(45) Date of Patent: Jun. 30, 2026

(54) METHOD AND SYSTEM FOR TRAINING A NEURAL NETWORK MODEL USING KNOWLEDGE DISTILLATION

(71) Applicants: Peyman Passban, Montreal (CA); Yimeng Wu, Montreal (CA); Mehdi Rezagholizadeh, Montreal (CA)

(72) Inventors: Peyman Passban, Montreal (CA); Yimeng Wu, Montreal (CA); Mehdi Rezagholizadeh, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1066 days.

(21) Appl. No.: 17/469,573

(22) Filed: Sep. 8, 2021

(65) Prior Publication Data

US 2022/0076136 A1 Mar. 10, 2022

Related U.S. Application Data

(60) Provisional application No. 63/076,335, filed on Sep. 9, 2020.

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ............................... G06N 3/045; G06N 3/088
See application file for complete search history.

(56) References Cited

U.S. PATENT DOCUMENTS

2019/0205748 A1 7/2019 Fukuda et al.

FOREIGN PATENT DOCUMENTS

| CN | 106548190 A | 3/2017 |
|---|---|---|
| CN | 109165738 A | 1/2019 |
| CN | 111105008 A | 5/2020 |
| CN | 111242297 A | 6/2020 |
| CN | 111611377 A | 9/2020 |

OTHER PUBLICATIONS

Sun, Siqi, et al. "Patient knowledge distillation for bert model compression." arXiv preprint arXiv:1908.09355 (2019) (Year: 2019).*
MIT OpenCourseWare (https://ocw.mit.edu/courses/18-01sc-single-variable-calculus-fall-2010/14798b1a310b0f2917e2d1cecd7494bf_MIT18_01SCF10_Ses61a.pdf, 2010) (Year: 2010).*

(Continued)

*Primary Examiner* — Schyler S Sanks

(57) ABSTRACT

An agnostic combinatorial knowledge distillation (CKD) method for transferring trained knowledge of neural model from a complex model (teacher) to a less complex model (student) is described. In addition to training the student to generate a final output that approximates both the teacher's final output and a ground truth of a training input, the method further maximizes knowledge transfer by training hidden layers of the student to generate outputs that approximate a representation of a subset of teacher hidden layers are mapped to each of the student hidden layers for a given training input.

20 Claims, 12 Drawing Sheets

(56)     References Cited

OTHER PUBLICATIONS

Yue (Yue, Kaiyu, Jiangfan Deng, and Feng Zhou. "Matching Guided Distillation." arXiv preprint arXiv:2008.09958 (2020)). (Year: 2020).*

Freitag (Freitag, Markus, Yaser Al-Onaizan, and Baskaran Sankaran. "Ensemble distillation for neural machine translation." arXiv preprint arXiv:1702.01802 (2017) (Year: 2017).*

T. Moriya, H. Sato, T. Tanaka, T. Ashihara, R. Masumura and Y. Shinohara, "Distilling Attention Weights for CTC-Based ASR Systems," ICASSP 2020—2020 IEEE International Conference on Acoustics, Speech and Signal Processing (ICASSP), Barcelona, Spain, 2020, pp. 6894-6898 (Year: 2020).*

Aguilar, G.; Ling, Y.; Zhang, Y.; Yao, B.; Fan, X.; and Guo, C., Knowledge Distillation from Internal Representations. In AAAI, pp. 7350-7357, 2020.

Dzmitry Bahdanau, Kyunghyun Cho, and Yoshua Bengio, Neural machine translation by jointly learning to align and translate, in 3rd International Conference on Learning Representations, ICLR, arXiv preprint arXiv:1409.0473, 2015.

Bar-Haim, R.; Dagan, I.; Dolan, B.; Ferro, L.; Giampiccolo, D.; Magnini, B.; and Szpektor, I., The second pascal recognising textual entailment challenge. In Proceedings of the second PASCAL challenges workshop on recognising textual entailment, vol. 6, 6-4. Venice, 2006.

Bentivogli, L.; Clark, P.; Dagan, I.; and Giampiccolo, D., The Fifth PASCAL Recognizing Textual Entailment Challenge. In TAC., 2009.

Buc Cristian Buciluá, Rich Caruana, and Alexandru Niculescu-Mizil, Model compression, In Proceedings of the 12th ACM SIGKDD international conference on Knowledge discovery and data mining, pp. 535-541, 2006.

Cer, D.; Diab, M.; Agirre, E.; Lopez-Gazpio, I.; and Specia, L., Semeval-2017 task 1: Semantic textual similarity-multilingual and cross-lingual focused evaluation. arXiv preprint arXiv:1708.00055, 2017.

Dagan, I.; Glickman, O.; and Magnini, B., The PAS-CAL recognising textual entailment challenge. In Machine Learning Challenges Workshop, 177-190. Springer, 2005.

Jacob Devlin, Ming-Wei Chang, Kenton Lee, and Kristina Toutanova, BERT: Pre-training of Deep Bidirectional Transformers for Language Understanding, In Proceedings of the 2019 Conference f the North American Chapter of the Association for Computational Linguistics: Human Language Technologies, vol. 1 (Long and Short Papers), pp. 4171-4186, 2019.

Dolan, W. B.; and Brockett, C., Automatically constructing a corpus of sentential paraphrases. In Proceedings of the Third International Workshop on Paraphrasing (IWP2005), 2005.

Markus Freitag, Yaser Al-Onaizan, and Baskaran Sankaran, Ensemble distillation for neural machine translation, ArXiv preprint arXiv:1702. 01802, 2017.

Furlanello, T.; Lipton, Z. C.; Tschannen, M.; Itti, L.; and Anandkumar, A., Born Again Neural Networks, 2018.

Giampiccolo, D.; Magnini, B.; Dagan, I.; and Dolan, B., The third pascal recognizing textual entailment challenge. In Proceedings of the ACL-PASCAL workshop on textual entailment and paraphrasing, 1-9. Association for Computational Linguistics, 2007.

Geoffrey Hinton, Oriol Vinyals, and Jeff Dean, Distilling the knowledge in a neural network, arXiv preprint arXiv:1503.02531, 2015.

Iyer, S.; Dandekar, N.; and Csernai, K., First Quora Dataset Release: Question Pairs. URL https://data.quora.com/First-Quora-Dataset-Release-Question-Pairs, 2017.

Xiaoqi Jiao, Yichun Yin, Lifeng Shang, Xin Jiang, Xiao Chen, Linlin Li, Fang Wang, and Qun Liu, Tinybert: Distilling bert for natural language understanding. arXiv preprint arXiv:1909.10351, 2019.

Yoon Kim and Alexander M Rush, Sequence-Level Knowledge Distillation, In Proceedings of the 2016 Conference on Empirical Methods in Natural Language Processing, pp. 1317-1327, 2016.

Liu, X.; He, P.; Chen, W.; and Gao, J., Improving MultiTask Deep Neural Networks via Knowledge Distillation for Natural Language Understanding. ArXiv abs/1904.09482, 2019.

Peters, M. E.; Neumann, M.; Iyyer, M.; Gardner, M.; Clark, C.; Lee, K.; and Zettlemoyer, L., Deep contextualized word representations. In Proc. of NAACL, 2018.

Rajpurkar, P.; Zhang, J.; Lopyrev, K.; and Liang, P., Squad: 100,000+ questions for machine comprehension of text. arXiv preprint arXiv: 1606.05250, 2016.

Sanh, V.; Debut, L.; Chaumond, J.; and Wolf, T., DistilBERT, a distilled version of BERT: smaller, faster, cheaper and lighter. ArXiv abs/1910.01108, 2019.

Socher, R.; Perelygin, A.; Wu, J.; Chuang, J.; Manning, C. D.; Ng, A.; and Potts, C., Recursive deep models for semantic compositionality over a sentiment treebank. In Proceedings of the 2013 conference on empirical methods in natural language processing, 1631-1642, 2013.

Siqi Sun, Yu Cheng, Zhe Gan, and Jingjing Liu, Patient Knowledge Distillation for BERT Model Compression. In Proceedings of the 2019 Conference on Empirical Methods in Natural Language Processing and the 9th International Joint Conference on Natural Language Processing (EMNLP-IJCNLP), pp. 4314-4323, 2019.

Zhiqing Sun, Hongkun Yu, Xiaodan Song, Renjie Liu, Yiming Yang, and Denny Zhou, Mobilebert: a compact task-agnostic bert for resource-limited devices. arXiv preprint arXiv:2004.02984, 2020.

Xu Tan, Yi Ren, Di He, Tao Qin, and Tie-Yan Liu, Multilingual Neural Machine Translation with Knowledge Distillation. In International Conference on Learning Representations. URL https://openreview.net/forum?id=S1gUsoR9YX, 2019.

Ashish Vaswani, Noam Shazeer, Niki Parmar, Jakob Uszkoreit, Llion Jones, Aidan N Gomez, Łukasz Kaiser, and Illia Polosukhin, Attention is all you need. In Advances in neural information processing systems, pp. 5998-6008, 2017.

Wang, A.; Singh, A.; Michael, J.; Hill, F.; Levy, O.; and Bowman, S. R., GLUE: A Multi-Task Benchmark and Analysis Platform for Natural Language Understanding. ArXiv abs/1804.07461, 2018.

Wang, W.; Wei, F.; Dong, L.; Bao, H.; Yang, N.; and Zhou, M., Minilm: Deep self-attention distillation for task-agnostic compression of pre-trained transformers. arXiv preprint arXiv:2002.10957, 2020.

Warstadt, A.; Singh, A.; and Bowman, S. R., Neural Network Acceptability Judgments. arXiv preprint arXiv:1805.12471, 2018.

Hao-Ran Wei, Shujian Huang, Ran Wang, Xinyu Dai, and Jiajun Chen, Online Distilling from Checkpoints for Neural Machine Translation. In Proceedings of the 2019 Conference of the North American Chapter of the Association for Computational Linguistics: Human Language Technologies, vol. 1 (Long and Short Papers), pp. 1932-1941, 2019.

Williams, A.; Nangia, N.; and Bowman, S., A Broad-Coverage Challenge Corpus for Sentence Understanding through Inference. In Proceedings of the 2018 Conference of the North American Chapter of the Association for Computational Linguistics: Human Language Technologies, vol. 1 (Long Papers), pp. 1112-1122, 2018.

Kevin Clark, Urvashi Khandelwal, Omer Levy, and Christopher D Manning, What does BERTlook at? An analysis of BERT's attention, In Proceedings of the 2019 ACL Workshop BlackboxNLP: Analyzing and Interpreting Neural Networks for NLP, pp. 276-286, 2019.

Sepp Hochreiter and Jürgen Schmidhuber, Long short-term memory. Neural computation, 9(8): pp. 1735-1780, 1997.

Marcin Junczys-Dowmunt, Roman Grundkiewicz, Tomasz Dwojak, Hieu Hoang, Kenneth Heafield, Tom Neckermann, Frank Seide, Ulrich Germann, Alham Fikri Aji, Nikolay Bogoychev, Andre F. T. Martins, and Alexandra Birch, Marian: Fast neural machine translation in C++. In Proceedings of ACL 2018, System Demonstrations, Melbourne, Australia. Association for Computational Linguistics, pp. 116-121, 2018.

Guillaume Klein, Yoon Kim, Yuntian Deng, Jean Senel-Iart, and Alexander M. Rush, Opennmt: Open-source toolkit for neural machine translation. In Proc. ACL, 2017.

Taku Kudo and John Richardson, Sentencepiece: A simple and language independent subword tokenizer and detokenizer for neural

(56) References Cited

OTHER PUBLICATIONS text processing. In Proceedings of the 2018 Conference on Empirical Methods in Natural Language Processing: System Demonstrations, pp. 66-71, 2018.

Myle Ott, Sergey Edunov, Alexei Baevski, Angela Fan, Sam Gross, Nathan Ng, David Grangier, and Michael Auli, Fairseq: A fast, extensible toolkit for sequence modeling. In Proceedings of NAACL-HLT 2019: Demonstrations, 2019.

Kishore Papineni, Salim Roukos, Todd Ward, and Wei-Jing Zhu, Bleu: a method for automatic evaluation of machine translation. In Proceedings of the 40th annual meeting on association for computational linguistics, pp. 311-318. Association for Computational Linguistics, 2002.

Ashish Vaswani, Samy Bengio, Eugene Brevdo, Fran¬cois Chollet, Aidan N. Gomez, Stephan Gouws, Llion Jones, Łukasz Kaiser, Nal Kalchbrenner, Niki Parmar, Ryan Sepassi, Noam Shazeer, and Jakob Uszkoreit, Tensor2tensor for neural machine translation. CoRR, abs/1803.07416, 2018.

Clark, K., Luong, M. T., Khandelwal, U., Manning, C. D., & Le, Q. V., Bam! born-again multi-task networks for natural language understanding. arXiv preprint arXiv:1907.04829, 2019.

Matt Post, A Call for Clarity in Reporting BLEU Scores, Proceedings of the Third Conference on Machine Translation (WMT18), 6 pages, 2018.

Svante Wold, Kim Esbensen and Paul Geladi, Principal component analysis, Chemometrics and Intelligent Laboratory Systems, vol. 2, Issues 1-3, pp. 37-52, 1987.

* cited by examiner

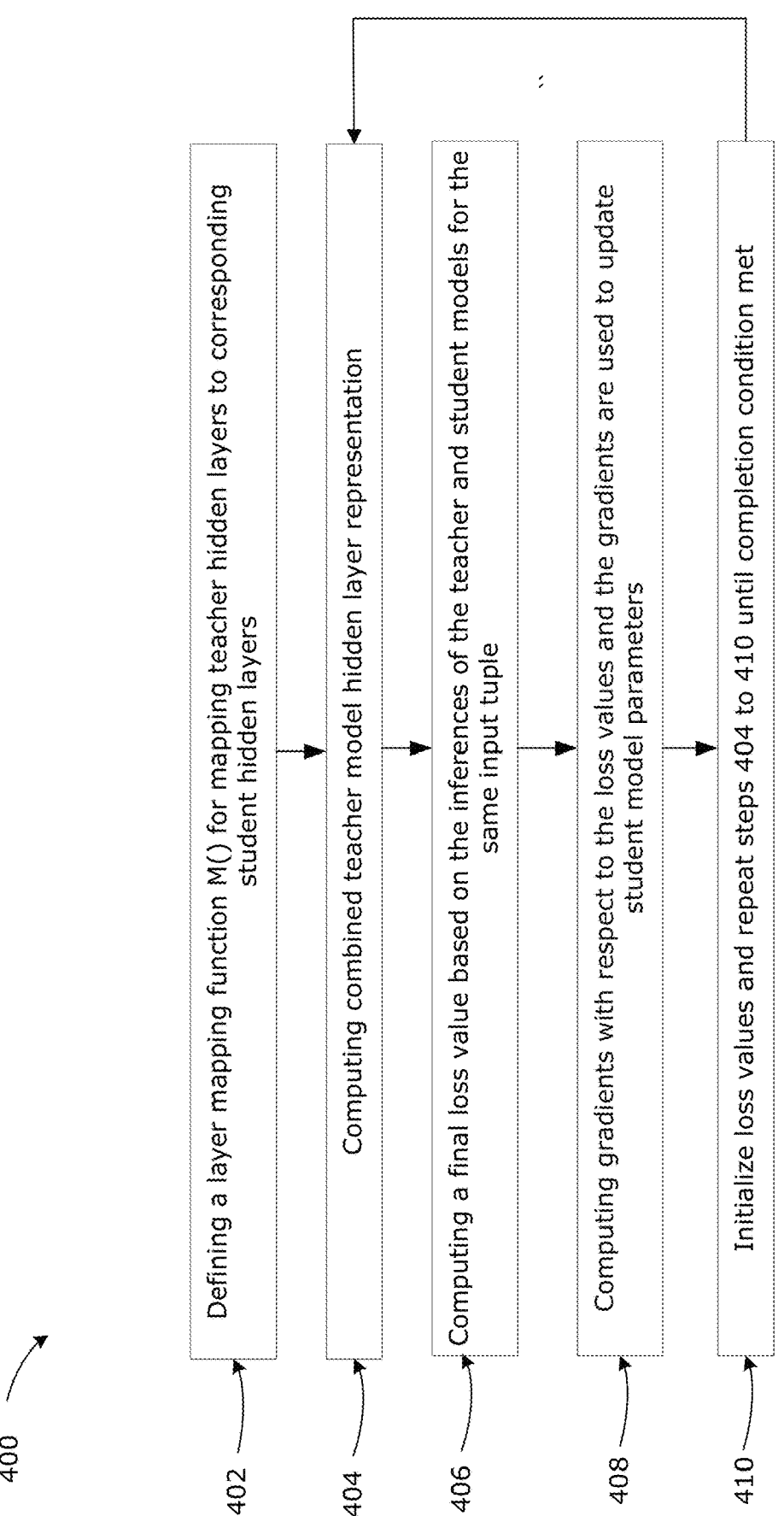

400

402  Defining a layer mapping function M() for mapping teacher hidden layers to corresponding student hidden layers 404  Computing combined teacher model hidden layer representation 406  Computing a final loss value based on the inferences of the teacher and student models for the same input tuple 408  Computing gradients with respect to the loss values and the gradients are used to update student model parameters 410  Initialize loss values and repeat steps 404 to 410 until completion condition met

FIG. 4

```
Algorithm 1: Combinatorial Knowledge Distillation (CKD/CKD*)
 Function Fusion(h_i^S, H^T, kd):
    ▷ h_i^S:  i-th layer of S,
    ▷ H^T:  a subset of T's layers which are selected to map
      to h_i^S
    ▷ kd:  Kd type (CKD or CKD*)
    if kd == CKD then
    |   f_i^T ← mul(W, Concat(H^T)) + b;
    else
    |   φ_ij = Φ(h_i^S, h_j^T);
    |   e_ij ← e^{φ_ij} / Σ_{h_j^T ∈ H^T} e^{φ_ij};
    |   f_i^T ← Σ_{h_j^T ∈ H^T} e_ij h_j^T;
    end
    return f_i^T;
 End Function Function ProposedKD(S, T, X, M, e, kd):
    ▷ S:  student network
    ▷ T:  teacher network
    ▷ (X, Y): set of input-output training pairs
    ▷ M: mapping function
    ▷ e:  training epochs
    ▷ kd:  kd type (CKD or CKD*)
    for i = 1 to e do
    |   L ← 0, L_all ← 0, L_KD ← 0, L_CKD ← 0;
    |   for (x, y) in (X, Y) do
    |   |   ℓ_CKD ← 0;
    |   |   for l in H^S do
    |   |   |   f_l^T ← Fusion(h_l^S, M(H^T), kd);
    |   |   |   ℓ_CKD ← ℓ_CKD + MSE(h_l^S, f_l^T);
    |   |   end
    |   |   L_CKD ← L_CKD + ℓ_CKD;
    |   |   L_KD ← L_KD + L_KD(θ_S, θ_T);
    |   |   L_all ← L_all + L_all(θ_S);
    |   |   L ← αL_all + βL_KD + ηL_CKD;
    |   end
    end
    return L;
 End Function
```

FIG. 6

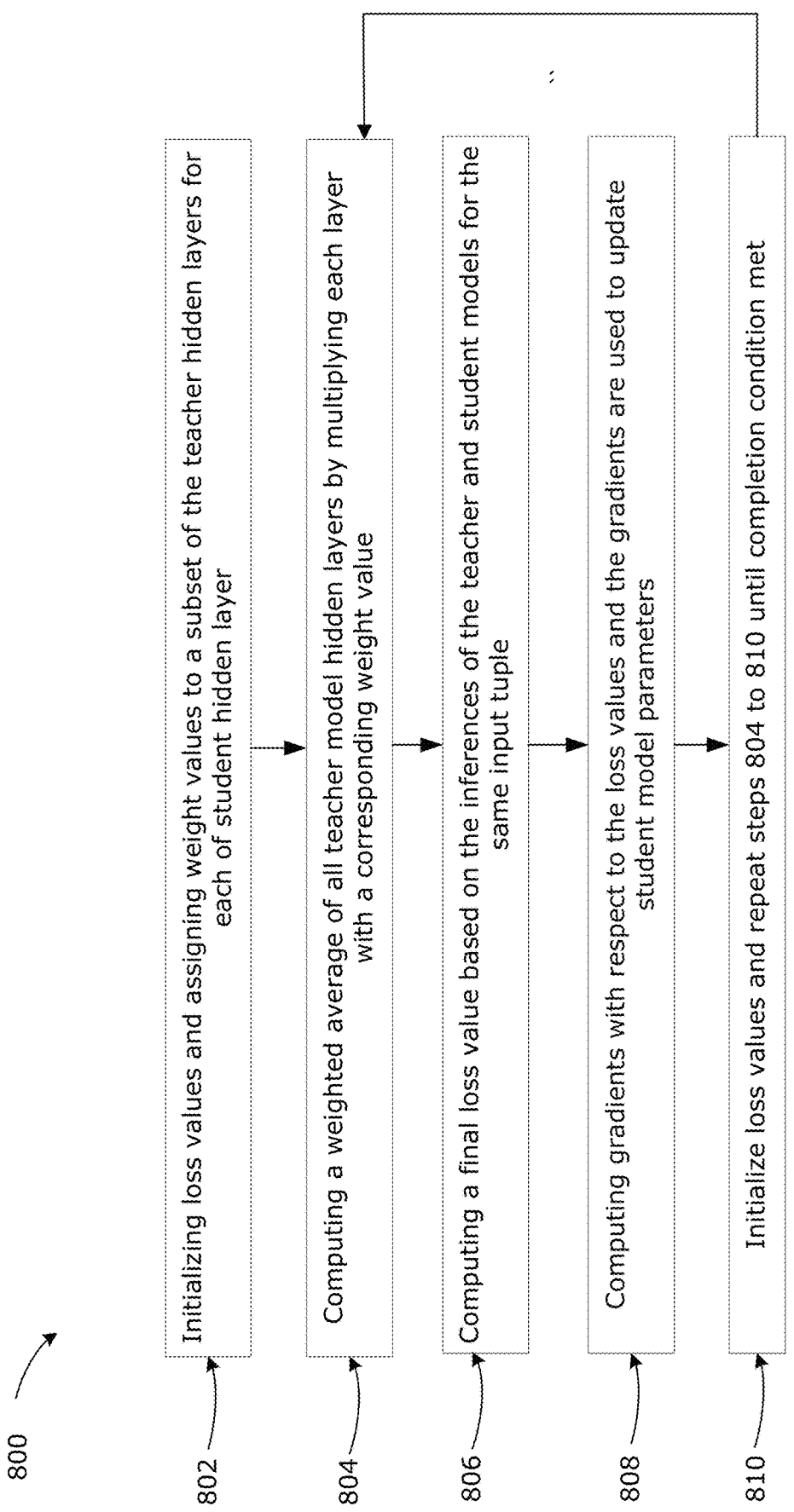

800

802 Initializing loss values and assigning weight values to a subset of the teacher hidden layers for each of student hidden layer

804 Computing a weighted average of all teacher model hidden layers by multiplying each layer with a corresponding weight value

806 Computing a final loss value based on the inferences of the teacher and student models for the same input tuple

808 Computing gradients with respect to the loss values and the gradients are used to update student model parameters

810 Initialize loss values and repeat steps 804 to 810 until completion condition met

FIG. 8

| Dataset | T | NKD | KD | PKD | Attention (no overlap) | Attention (partial overlap) | Attention (fully overlap) |
|---|---|---|---|---|---|---|---|
| QNLI (105K) | 91.25 | 85.13 | 86.77 | 86.64 | 87.11 | 86.95 | 87.02 |
| MRPC (3.7K) | 86.76 | 77.70 | 79.41 | 80.15 | 79.66 | 79.90 | 80.72 |
| RTE (2.5K) | 68.23 | 61.73 | 65.34 | 65.70 | 65.70 | 66.43 | 67.15 |

1002 — Initializing student model parameters

1004 — Computing a weighted KD loss from all teacher models

1006 — Computing attention weights for all teacher models for each training set

1008 — Computing a total KD loss from the weighted KD loss values

1010 — Updating student model parameters based on total KD loss gradient with respect to the student model

1100

1102 — Computing output of all teacher models and student model with input from training data set 1104 — Computing similarity between the student model output and each of the teacher model ouputs 1106 — Computing a weights assigned to each of the teacher models based on the similarity with student model output

METHOD AND SYSTEM FOR TRAINING A NEURAL NETWORK MODEL USING KNOWLEDGE DISTILLATION

RELATED APPLICATION DATA

The present application claims prior to, and the benefit of, provisional U.S. patent application Ser. No. 63/076,335, filed Sep. 9, 2020, the content of which is incorporated herein by reference.

TECHNICAL FIELD

The present application relates to methods and systems for training machine learning models, and, in particular, methods and systems for training deep neural networks using knowledge distillation.

BACKGROUND

A machine learning model infers (i.e. predicts) a particular output for each received input. The inferred (i.e. predicted) particular output may appear in the form of a probabilistic score that is indicative of which class a given input may belong to. For example, machine learning models may infer (i.e. predict) a particular output based on a received image, the inferred (i.e. predicted) output comprising a probabilistic score for each class of a set of classes where each score is representative of a probability that the image resembles an object belonging to that particular class.

Machine learning models are learned using learning algorithms, such as stochastic gradient descent. A machine learning model that is learned using such techniques is a deep artificial neural network that approximates this input-to-output process. A deep artificial neural network that is used to approximate a machine learning model includes an input layer, one or more hidden layers, and an output layer, where all of the hidden layers have parameters and non-linearity is applied to the parameters. A deep artificial neural network that is used to approximate a machine learning model is generally referred to as a neural network model.

Knowledge distillation (KD) is a neural network compression technique whereby the learned parameters, or knowledge, of a complex neural network model is transferred to a less complex neural network model that is able to make comparable inferences (i.e. predictions) as the complex model at less computing resource cost and time. Here, complex neural network model refers to a neural network model with a relatively high number of computing resources such as GPU/CPU power and computer memory space and/or those neural network models including a relatively high number of hidden layers. The complex neural network model, for the purposes of KD, is sometimes referred to as a teacher neural network model (T) or a teacher for short. A typical drawback of the teacher is that it may require significant computing resources that may not be available in consumer electronic devices, such as mobile communication devices or edge computing devices. Furthermore, the teacher neural network model typically requires a significant amount of time to infer (i.e. predict) a particular output for an input due to the complexity of the teacher neural network model itself, and hence the teacher neural network model may not be suitable for deployment to a consumer computing device for use therein. Thus, KD techniques are applied to extract, or distill the learned parameters, or knowledge, of a teacher neural network model and impart such knowledge to a less sophisticated neural network model with faster inference time and reduced computing resource and memory space cost that may with less effort on consumer computing devices, such as edge devices. The less complex neural network model is often referred to as the student neural network model (S) or a student for short.

The prior art KD techniques only consider final inference (i.e. prediction) of the particular output for a received input to compute the loss function, thus the prior art KD techniques are not equipped to handle knowledge transfer from hidden layers of the teacher to hidden layers of the student. Hence, it may be possible to improve the accuracy of KD techniques, especially for teacher and student neural network models that have multiple and deep hidden layers.

Patient Knowledge Distillation (PKD) focuses on this issue and introduces a layer-to-layer cost function, also known as internal layer mapping. Instead of only matching the inferred (i.e. predicted) outputs of the student and teacher neural network model, the outputs of the hidden layers of the teacher neural network are also used to train one or more hidden layers of the student neural network model. The hidden layers may refer to the internal layers in a neural network. Specifically, PKD selects a subset of outputs generated by the hidden layers of a teacher neural network model and trains one or more hidden layers of the student neural network using the outputs generated by the hidden layers of the teacher neural network model as shown in FIG. 1. Specifically, FIG. 1 illustrates a schematic diagram in which a teacher neural network model 100 having n=3 internal layers (the neural network shown on the right of FIG. 1) is used, with the PKD, to train a student neural network 110 having m=2 internal layers. As n>m, one of the internal layers of the teacher neural model neural network model in the illustrated embodiment as indicated by the dashed line is skipped so that each of the remaining internal layers of the teacher neural network model is directly used to train one of the internal layers of the corresponding student neural network model 110. As shown in FIG. 1, not only the final outputs inferred (i.e. predicted) by the student and teacher neural network models 110 and 100 are used to compute a loss for the KD loss in PKD but the outputs of the internal layers of the teacher and student neural network models are also matched so the student neural network model 110 can learn from the information flow inside the teacher neural network model 100.

However, there is no clear methodology for deciding which hidden layers of the teacher are skipped and which hidden layers of the teacher are kept for distillation. Thus, when distilling an n-layer teacher neural network model into an m-layer student neural network model, there may be significant information loss from the skipped hidden layers. The informational loss becomes more pronounced when n>>m.

Accordingly, it is desirable to provide improvements in knowledge distillation methods to minimize the informational loss from skipped internal (i.e. hidden) layers of the teacher neural network model.

SUMMARY

The present disclosure provides a method and system for training a deep neural network model using knowledge distillation (KD) that minimizes informational loss from skipped internal layers of a teacher neural network model.

In some aspects, the present disclosure describes a KD method that maps the internal (i.e. hidden) layers of a teacher neural network model to corresponding internal layers (i.e. hidden layers) of the student neural network model to minimize informational loss.

In some aspects, the present disclosure describes a KD method that includes an automated mapping and layer selection of the internal layers (i.e. hidden layers) of the teacher and the student models.

In some aspects, the present disclosure describes a KD method that adopts a combinatorial approach to layer mapping where one or more internal (i.e. hidden) layers of an n-layer teacher neural network model are mapped to one or more layers (i.e. hidden layers) of an m-layer student neural network model, where n>m whereby informational loss may be minimized.

In some aspects, the present disclosure describes a KD method with a combinatorial approach to mapping one or more hidden layers of the teacher neural network model to an internal layer (i.e., hidden layer) of the student neural network model that is agnostic to the architectures of the teacher and student neural network model. For example, aspects of the KD method of the present disclosure enable distillation of knowledge from internal (i.e. hidden) layers of the teacher neural network model, such as a transformer model, to one or more layers of the student neural network model, such as a recurrent neural network model.

In some aspects, the present disclosure describes a KD method that may improve upon the performance of a trained Bidirectional Encoder Representations for Transformers (BERT) deep learning student neural network model that is evaluated using the General Language Understanding Evaluation (GLUE) benchmark.

In some aspects, the present disclosure describes a KD method that may improve upon neural machine translation models.

In some aspects, the present disclosure describes a knowledge distillation method that may be capable of mapping internal layers (i.e. hidden layers) of a plurality of teacher neural network models to a single student neural network model. Mapping internal layers (i.e. hidden layers) involves associating one or more internal (hidden) layers of the teacher neural network models with one internal (hidden) layer of the single student neural network model.

In some aspects, the KD methods described herein may be used to train a student neural network model that can be deployed to edge devices.

In some aspects, methods described herein may aggregate different sources of information, including multilingual/multi-domain language understanding/processing/translation models.

In some aspects, KD methods described herein may be task agnostic such that they may be applicable to training a model for any particular task, including computer vision tasks such as object classification.

In some aspects, for server-side models which serve external users, multiple models may be combined through the KD methods described herein and the final trained teacher model may be uploaded to the server. By being capable of performing knowledge distillation from different teacher neural network models, the method may be immune against any adversarial attacks.

In accordance with the first embodiment of a first aspect of the present disclosure, there is provided a method of knowledge distillation from a teacher machine learning model having a plurality of teacher hidden layers to a student machine learning model having a plurality of student hidden layers. The method comprises training the teacher machine learning model, wherein the teacher machine learning model is configured to receive an input and generate a teacher output, and training the student machine learning model on a plurality of training inputs, wherein the student machine learning model is also configured to receive inputs and generate corresponding outputs. Training the student machine learning model comprises processing each training input using the teacher machine learning model to generate the teacher output for the training input, wherein each of the plurality of teacher hidden layers generates a teacher hidden layer output. Training the student machine learning model further comprises mapping a subset of the plurality of teacher hidden layers to each of the plurality of student hidden layers. Training the student machine learning model further comprises calculating a representation of the teacher hidden layer outputs of the subset of the plurality of teacher hidden layers mapped to each of the plurality of student hidden layers. Training the student machine learning model further comprises training the student to, for each of the training inputs, generate a student output that approximates the teacher output for the training input, wherein each of the plurality of student hidden layers, for each of the training inputs, is trained to generate a student hidden layer output that approximates the representation of the subset of the plurality of teacher hidden layers mapped to the each of the plurality of student hidden layers.

In some or all examples of the first embodiment of the first aspect, the method further comprises training the student to, for each of the training inputs, generate a student output that approximates a ground truth of the training input.

In some or all examples of the first embodiment of the first aspect, training the student to generate a student output that approximates the teacher output for the training input further comprises: calculating a knowledge distillation (KD) loss between the student output and the teacher output; calculating a standard loss between the student output and the ground truth; calculating a combinatorial KD (CKD) loss between each of the plurality of student hidden layers and the subset of the teacher hidden layers mapped to each of the plurality of student layer; calculating a total loss as a weighted average of the KD loss, the standard loss and the CKD loss; and adjusting parameters of the student to minimize the total loss.

In some examples, the CKD loss is computed by:

$$\mathcal{L}_{CKD} = \sum\nolimits_{h_i^s \in H^s} MSE\left(h_i^s, f_i^T\right)$$

where $\mathcal{L}_{CKD}$ is the CKD loss, MSE( ) is a mean-square error function, $$h_i^s$$

is the i$^{th}$ hidden layer of the student, $$f_i^T$$

in the i$^{th}$ hidden layer of the teacher computed by $$f_i^T = F\left(H^T(i)\right), \text{ where}$$
$$H^T(i) = \left\{h_j^T \middle| j \in M(i)\right\},$$

F( ) is a fusion function provided by the first $$\left(h_1^T\right)$$

and third $$\left(h_3^T\right)$$

hidden layers of the teacher, the output of F( ) being mapped to the second hidden layer of the student $$\left(h_2^S\right),$$

$H^S$ and $H^T$ are the set of all hidden layers of the student and the teacher, respectively, $H^T(i)$ is a subset of the hidden layers of the teacher selected to be mapped to the $i^{th}$ hidden layer of the student, and M( ) is a mapper function that takes an index referencing to a hidden layer of the student and returns a set of indices for the teacher.

In some or all examples, the fusion function F( ) includes a concatenation operation followed by a linear projection layer.

In some or all examples, the fusion function F( ) is defined by:

$$F\left(h_1^T, h_3^T\right) = mul\left(W, \left[h_1^T; h_3^T\right]\right) + b$$

where ";" is a concatenation operator, mul( ) is the matrix multiplication operation, and W and b are learnable parameters. In this example we only considered two layers namely Layers 3 and 1 from the teacher side but this can be extended to any number of layers.

In some or all examples, the mapping function M( ) defines a combination policy for combining the hidden layers of the teacher.

In some or all examples, the mapping further comprises, defining a combination policy for mapping the teacher hidden layers to each of the plurality of student hidden layers.

In some or all examples, the combination policy is any one of overlap combination, regular combination, skip combination, and cross combination.

In some or all examples, the mapping further comprises, for each of the student hidden layers, assigning an attention weight to the teacher hidden layer output of each of the subset of the plurality of teacher hidden layers.

In some examples, CKD could be augmented with attention or other forms of combination, which is noted as CKD* herein. the CKD* loss is computed by:

$$L_{CKD^*}\left(H^s, H^T\right) = \sum_{h_i^s \in H^s} MSE\left(h_i^s, f_i^{*T}\right)$$

where $L_{CKD^*}$ is the CKD* loss, MSE( ) is a mean-square error function, $$h_i^s$$

is the $i^{th}$ hidden layer of the student, and $$f_i^{*T}$$

is a combined version which could be an attention-based or other forms of combination of the hidden layers ($H^T$) of the teacher for the $i^{th}$ hidden layer of the teacher.

In some examples, when student and teacher have identical dimensions $$\left(\left|h_i^s\right| = \left|h_j^T\right|\right), f_i^{*T}$$

is computed by:

$$f_i^{*T} = \sum_{h_j^T \in H^T} \epsilon_{ij} h_j^T$$

where $\epsilon_{ij}$ is an attention weight indicating how much the $j^{th}$ hidden layer of the teacher $$\left(h_j^T\right)$$

contributes to the knowledge distillation process of the $i^{th}$ hidden layer of the student $$\left(h_i^s\right), h_j^T$$

is the $j^{th}$ hidden layer of the teacher, and $H^T$ is the set of all hidden layers of the teacher.

In some examples, when student and teacher have different dimensions $$\left(\left|h_i^s\right| \neq \left|h_j^T\right|\right), f_i^{*T}$$

is computed by:

$$f_i^{*T} = \sum_{h_j^T \in H^T} \epsilon_{ij}\left(W_i h_j^T\right)$$

where $\epsilon_{ij}$ is an attention weight indicating how much the $j^{th}$ hidden layer of the teacher $$\left(h_j^T\right)$$

contributes to the knowledge distillation process of the $i^{th}$ hidden layer of the student $$\left(h_i^s\right), h_j^T$$

is the $j^{th}$ hidden layer of the teacher, $H^T$ is the set of all hidden layers of the teacher, and $$W_i \in \mathbb{R}^{|h_i^S| \times |h_j^T|}$$

is the weight value which takes care of the dimension mismatch.

The sum of attention weights ($\epsilon_{ij}$) is 1.

In some examples, the attention weights ($\epsilon_{ij}$) are computed by:

$$\epsilon_{ij} = \frac{e^{\varphi_{ij}}}{\sum_{k=1}^{k=|H^T|} e^{\varphi_{ik}}}$$

where $$\varphi_{ij} = \Phi\left(h_i^s, h_j^T\right)$$

is an energy score between the output generated by the $i^{th}$ hidden layer of the student $$\left(h_i^s\right)$$

and the output generated by the $j^{th}$ hidden layer of the teacher $$\left(h_j^T\right),$$

the energy score being indicative of a similarity between the two generated outputs, $$\varphi_{ij} = \Phi\left(h_i^s, h_k^T\right)$$

is an energy score between the output generated by the $i^{th}$ hidden layer of the student $$\left(h_i^s\right)$$

and the output generated by the $k^{th}$ hidden layer of the teacher $$\left(h_k^T\right),$$

the energy score being indicative of a similarity between the two generated outputs, $\Phi(h^S, h^T)$ is an energy function of an output generated by a hidden layer of the student and an output generated by a hidden layer of the teacher, $$h_k^T$$

where $k \in \{1, \ldots, |H^T|\}$ is a $k^{th}$ layer of the teacher that belongs to the set $H^T$, $H^T$ is the set of all hidden layers of the teacher, and $|H^T|$ is the size of the set $H^T$ representing the total number of hidden layers of the teacher.

In some examples, the energy function $$\Phi\left(h_i^s, h_j^T\right)$$

is computed as the dot product of the output of the $i^{th}$ hidden layer of the student $$\left(h_i^s\right)$$

and the weighted value of the output generated by the $j^{th}$ hidden layer of the teacher $$\left(h_j^T\right)$$

by:

$$\Phi\left(h_i^s, h_j^T\right) \equiv \langle h_i^s, h_j^T \rangle.$$

In some examples, the attention weights ($\epsilon_{ij}$) are computed by:

$$\epsilon_{ij} = \frac{e^{\varphi_{ij}}}{\sum_{k=1}^{k=|H^T|} e^{\varphi_{ik}}}$$

where $$\varphi_{ij} = \Phi\left(h_i^s, h_j^T\right)$$

is an energy score between the output generated by the $i^{th}$ hidden layer of the student $$\left(h_i^s\right)$$

and the output generated by the $j^{th}$ hidden layer of the teacher $$\left(h_j^T\right),$$

the energy score being indicative of a similarity between the two generated outputs, $$\varphi_{ik} = \Phi\big(h_i^s, h_k^T\big)$$

is an energy score between the output generated by the $i^{th}$ hidden layer of the student $$(h_i^s)$$

and the output generated by the $k^{th}$ hidden layer of the teacher $$(h_k^T),$$

the energy score being indicative of a similarity between the two generated outputs,
$\Phi(h^S, h^T)$ is an energy function of an output generated by a hidden layer of the student and an output generated by a hidden layer of the teacher, $$h_k^T$$

where $k \in \{1, \ldots, |H^T|\}$ is a $k^{th}$ layer of the teacher that belongs to the set $H^T$,
$H^T$ is the set of all hidden layers of the teacher, and
$|H^T|$ is the size of the set $H^T$ representing the total number of hidden layers of the teacher.
In some examples, the energy function $$\Phi\big(h_i^s, h_j^T\big)$$

is computed as the dot product of the output of the $i^{th}$ hidden layer of the student $$(h_i^s)$$

and the weighted value of the output generated by the $j^{th}$ hidden layer of the teacher $$(h_j^T)$$

by:

$$\Phi\big(h_i^s, h_j^T\big) \equiv \;<h_i^s, W_i h_j^T>.$$

In accordance with a second embodiment of the first aspect of the present disclosure, there is provided a method of knowledge distillation from a plurality of teacher machine learning models each having a plurality of teacher hidden layers to a student machine learning model having a plurality of student hidden layers. The method comprises training the plurality of teacher machine learning models, wherein each of the plurality of the teacher machine learning models is configured to receive an input and generate a teacher output, and training the student machine learning model on a plurality of training inputs, wherein the student machine learning model is also configured to receive inputs and generate a student output. Training the student machine learning model comprises processing each training input using the plurality of teacher machine learning models to generate a plurality of teacher outputs for the training input, each of the plurality of teacher hidden layers of each of the plurality of teacher machine learning models generating a teacher hidden layer outputs. Training the student machine learning model further comprises: mapping a subset of the plurality of teacher hidden layers of the plurality of teacher machine learning models to each of the plurality of student hidden layers. Training the student machine learning model further comprises: calculating a representation of the teacher hidden layer outputs of the subset of the plurality of teacher hidden layers mapped to each of the plurality of student hidden layers. Training the student machine learning model further comprises: training the student to, for each of the training inputs, generate the student output that approximates the teacher output for the training input, wherein each of the plurality of student hidden layers, for each of the training inputs, is trained to generate a student hidden layer output that approximates the representation of the subset of the plurality of teacher hidden layers mapped to the each of the plurality of student hidden layers.

In accordance with another aspect of the present disclosure, there is provided a computing device comprising a processor and a memory, the memory having tangibly stored thereon executable instructions for execution by the processor. The executable instructions, in response to execution by the processor, cause the computing device to perform the methods described above and herein.

In accordance with a further aspect of the present disclosure, there is provided a non-transitory machine-readable storage medium having tangibly stored thereon executable instructions for execution by a processor of a computing device. The executable instructions, in response to execution by the processor, cause the computing device to perform the methods described above and herein.

Other aspects and features of the present disclosure will become apparent to those of ordinary skill in the art upon review of the following description of specific implementations

BRIEF DESCRIPTION OF THE DRAWINGS

Reference will now be made, by way of example, to the accompanying drawings which show example embodiments of the present application, and in which:

FIG. 4 illustrates a flowchart for an example knowledge distillation method without attention in accordance with the present disclosure;

FIG. 6 shows an example pseudo code of portions of the method in FIG. 4;

FIG. 8 illustrates a flowchart for an example knowledge distillation method with attention in accordance with the present disclosure;

FIG. 9 illustrates a table showing simulation results of the various KD models in performing General Language Understanding Evaluation (GLUE) benchmarks;

DETAILED DESCRIPTION OF EXAMPLE EMBODIMENTS

Figure 1:
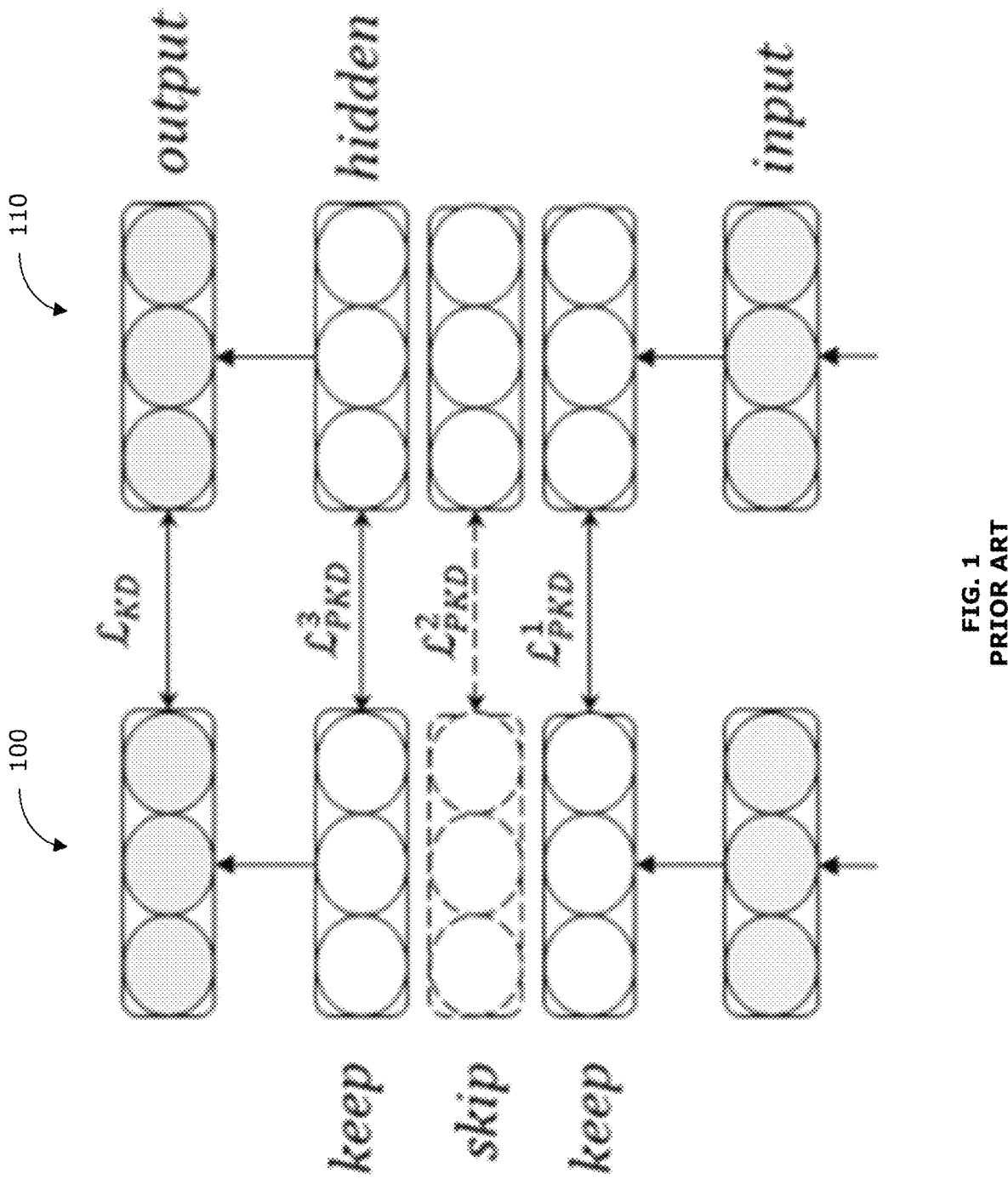
FIG. 1 illustrates a schematic diagram of a prior art PKD method.

The present disclosure is made with reference to the accompanying drawings, in which embodiments of technical solutions are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable storage medium. Lastly, elements referred to in the singular may be plural and vice versa, except where indicated otherwise either explicitly or inherently by context.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The following is a partial list of acronyms and associated definitions that may be used in the following description:

NMT: Neural Machine Translation

BERT: Bidirectional Encoder Representation from Transformers

KD: Knowledge Distillation

PKD: Patient Knowledge Distillation

S: Student

T: Teacher

RKD: Regular Knowledge Distillation

CKD: Combinatorial Knowledge Distillation

RC: Regular Combination

OC: Overlap Combination

SC: Skip Combination

CC: Cross Combination

A combinatorial knowledge distillation (CKD) method is described herein for improving informational loss as the result of skipping one or more hidden layers of a teacher neural network model during training of a student neural network model. The teacher neural network model and the student neural network model are trained for a particular task, such as object classification, neural machine translation, etc. The present description also describes example embodiments of a knowledge distillation method that may enable mapping of one or more hidden layers of a teacher neural network model to a hidden layer of a single student neural network model for the purpose of KD. Mapping involves associating one or more layers of a teacher neural network model to a hidden layer of the student neural network model.

Conventional training a neural network model (i.e. the student neural network model) without KD, involves minimizing a cross entropy function in the form of a negative log-likelihood loss function ($\mathcal{L}_{nll}$) in accordance with Equation (1):

$$\mathcal{L}_{nll}(\theta_S) = -\sum_{v=1}^{|V|} 1(y = v) \log p(y = v \,|\, x; \theta_S) \tag{1}$$

$1(y=v)$ is an indicator function that outputs a "1" if the inferred (i.e. predicted) output generated by the neural network model y for the training data sample equals the ground truth v, else it outputs a "0". The variables (x,y) are a tuple of a training data sample included in a training dataset comprising several training data samples, where x is the input and y is the ground truth output. Parameters $\theta$s and |V| are the parameter set of the neural network model and the number of outputs, respectively. This loss may be referred to as the standard loss.

However, when performing conventional training of a neural network model, the neural network model does not receive any feedback for incorrect outputs inferred (i.e. predicted) by the neural network model when the indicator function 1(y=v) returns zero. Without the negative feedback to penalize an incorrect output y inferred (i.e. predicated) by the neural network model, it may take a longer time to train the neural network model. This issue is in part resolved by applying KD to the process of training a neural network model where the loss function in the form of Equation (1) is extended with an additional term, as shown in Equation (2):

$$\mathcal{L}_{KD}(\theta_T, \theta_S) = -\sum_{v=1}^{|V|} q(y = v \mid x; \theta_T) \times \log p(y = v \mid x; \theta_S) \quad (2)$$

Where the output inferred (i.e. predicted) by the neural network model are penalized with its own standard loss against the ground truth but also a loss against the output generated by hidden layers of the teacher model given by q(y=v|x; $\theta_T$), which may be referred to as the KD loss. In Equation (2), the first component of the loss function or the KD loss, namely q((y=v|x; $\theta_T$)), is often referred to as the soft loss as it is compared to the inferences (i.e. predictions) (also known as soft labels) made by a softmax function of the teacher model. The remaining loss components, such as the standard loss, are known as the hard loss. Accordingly, in typical KD approaches, the overall loss function includes at least two loss terms, namely the standard loss and the KD loss, accordingly to Equation (3):

$$\mathcal{L} = \alpha \, \mathcal{L}_{nll} + (1 - \alpha) \mathcal{L}_{KD} \quad (3)$$

where $\alpha$ is a hyperparameter having a value of $0 \le \alpha \le 1$. A hyperparameter is a configuration that is external to the neural network model and whose value cannot be estimated from data.

Figure 2:
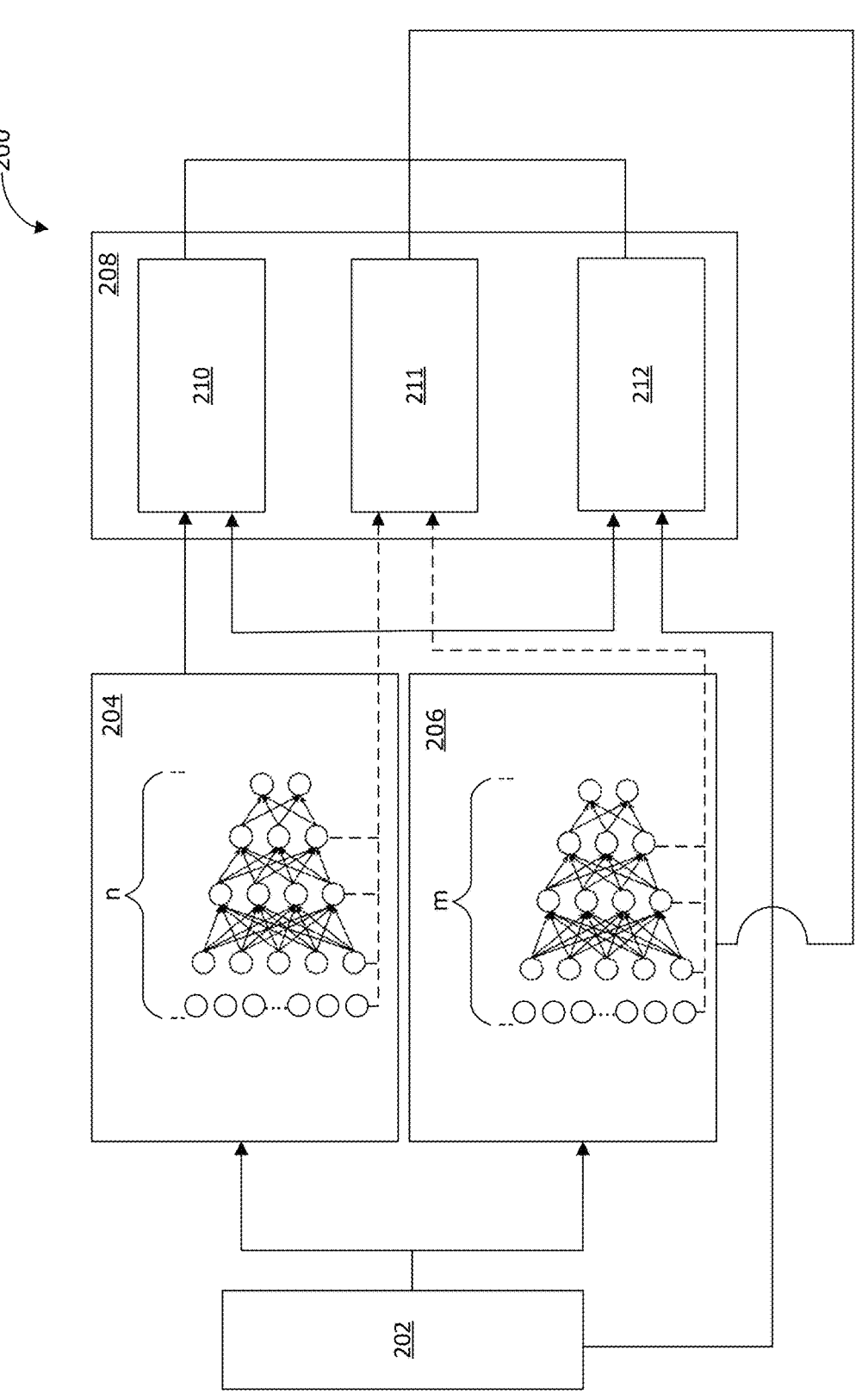
FIG. 2 illustrates a block diagram of a machine learning system for training a neural network model using KD in accordance with the present disclosure.

FIG. 2 illustrates a block diagram of a machine learning system 200 for training a neural network model using KD in accordance with the present disclosure, which may also be referred to as the combinatorial knowledge distillation (CKD). The machine learning system 200 may be implemented by one or more physical processing units of an electronic device (not shown), for example by the processing unit(s) executing computer-readable instructions (which may be stored in a memory of the robot electronic device) to perform methods described herein.

In the illustrated embodiment, a tuple 202 including an input tensor (x) and a corresponding output tensor (y) may be provided to an n-layer teacher neural network model 204, referred to hereinafter as teacher 204, as well as an m-layer student neural network model 206, hereinafter referred to as student 206, where n>m. The tuple 202 is a training data sample that is part of a training dataset comprising a plurality of tuples 202. Generally, each of the teacher 204 and the student 206 are a neural network that is configured to infer (i.e. predict an output tensor (y) based on input tensor (x) of the tuple 202 and a set of parameters of the neural network. The teacher 204 may be a complex neural network model. The student 206 may be a less complex neural network model. The student 206 may be a less complex (n>m or having fewer hidden layers and fewer model parameters) than the teacher 204 such that the student 206 demands less computing resource cost than that of the teacher 204 and may infer (i.e. predict) an output for a particular task in a comparable shorter time.

In some embodiments, the teacher 204 may be trained using a supervised or unsupervised learning algorithm and on a set of training data comprising a plurality of tuples 202 to learn the parameters of the teacher 204 and the parameters of the student 206. The teacher 204 may be trained for a classification task so that the inferred (i.e. predicted) output of the teacher 204 is a tensor includes a probability value for each class in a set of classes. For example, if the input tensor (x) includes an image containing handwritten number, the inferred (i.e. predicted) output (y) may comprise probability scores of the handwritten number belonging to each of the classes such as numerical digits "0" to "9". In some embodiments, the teacher 204 is trained prior to training of the student 206. In some other embodiments, the teacher 204 and the student model 206 are trained concurrently.

In some embodiments, the teacher 204 is a single neural network model. In some other embodiments, the teacher 204 is an ensemble neural network model that is a compilation of multiple individual neural network models that have been trained separately, with the inferred (i.e. predicted) outputs of the individual neural network models being combined to generate the output of the teacher 204. In some further embodiments, the neural network models in the ensemble neural network model include classification models that infer (i.e. predict) outputs for each class of a set of classes and one or more specialist models that generate scores for only a respective subset of the classes.

In the illustrated embodiment, the inferred (i.e. predicted) output as well as the outputs of hidden layers of the teacher 204 and the student 206 are provided to a loss computation module 208. The loss computation module 208, as shown, includes a KD loss computation submodule 210, a CKD loss computation submodule 211, and a standard loss computation submodule 212. The KD loss computation submodule 210 compares the inferred (i.e. predicted) output of teacher 204 and the student 206 to compute a KD loss value as described in more detail below. The CKD loss computation submodule 211 maps a subset of the hidden layers of the teacher 204 to a hidden layer of the student 206 and determines a CKD loss between the outputs generated by the hidden layer of the student 206 and a representation of the outputs generated by the subset of hidden layers of the teacher 204 that are mapped to the hidden layer of the student 206. The standard loss computation submodule 212 compares the inferred (i.e. predicted) output of the student 206 with the ground truth of the tuple 202 to compute a standard loss value as described in more detail below. The loss computation module 208 further computes the KD loss value, the CKD loss value, and the standard loss value through a loss function to generate a cross entropy value that is back propagated to the student 206 for adjustment of the parameters of the student 206 (i.e. the parameters of the student neural network model). After the student 206 is trained, it may be deployed onto a computing device (not shown) and used to make predictions. In some embodiments, the computing device upon which the student 206 is deployed is a low capacity, low complexity computing device that is capable of executing the student 206 with a shorter run time. In some embodiments, the computing device upon which the student 206 is deployed is a mobile communication device, such as a smartphone, smart watch, laptop computer, or a tablet.

As described above, in PKD, finding a skippable hidden layer of the teacher 204 is one of the main challenges. Since there is no one-to-one correspondence between the hidden layers of teacher 204 and hidden layers of the student 206, existing techniques such as PKD skip some of the hidden layers of the teacher 204 in the process of distillation. Accordingly, machine learning system 200 utilizing CKD may be capable of fusing or combining hidden layers of the teacher 204, for example by CKD loss computation submodule 211, and benefit from all or most of the learned parameters stored in all hidden layers of the teacher 204.

In some embodiments, the CKD loss function in accordance with the present disclosure may be mathematically formulated as Equation (4A):

$$\mathcal{L}_{CKD} = \sum_{h_i^s \in H^S} MSE\left(h_i^s, f_i^T\right) \tag{4A}$$

where $$f_i^T$$

is the $i^{th}$ hidden layer of the teacher computed by $$f_i^T = F\left(H^T(i)\right), \text{ where } H^T(i) = \left\{h_j^T \mid j \in M(i)\right\},$$

F ( ) is a fusion function. $H^S$ and $H^T$ indicate the set of all hidden layers of the student 206 and the teacher 204, respectively. Parameter $H^T(i)$ is a subset of the hidden layers of the teacher 204 selected to be mapped to the $i^{th}$ hidden layer of the student 206. The function MSE( ) is a mean-square error function, and $$h_i^s$$

is the $i^{th}$ hidden layer of the student 206. The MSE is but one of many possible realizations of the CKD loss function, and any other suitable methods such as valid matrix norms may also be used.

In PKD, $$f_i^T$$

is the $i^{th}$ hidden layer of the teacher 204 whereas, by comparison, in some embodiments of the CKD in accordance with the present disclosure $$f_i^T$$

is the result of a combination applied through the fusion function F( ) to a select subset of hidden layers of the teacher 204 in accordance with Equation (4B):

$$f_i^T = F\left(H^T(i)\right); H^T(i) = \left\{h_j^T \mid j \in M(i)\right\} \tag{4B}$$

In some embodiments, the selected subset of the teacher 204, $H^T(i)$, is defined via a mapper function M( ) that takes an index referencing to a hidden layer of the student 206 and returns a set of indices for the teacher 204. Based on the indices returned from M( ), the corresponding hidden layers of the teacher 204 are combined for the knowledge distillation process. By way of a non-limiting example, for an index of 2, the function M(2) may return indices {1,3}. Accordingly, the fusion function F( ) is provided by the first $$\left(h_1^T\right)$$

and third $$\left(h_3^T\right)$$

hidden layers of the teacher 204 and the output of F( ) is mapped to the second $$\left(h_2^S\right)$$

hidden layer of the student 206.

In some embodiments, the fusion function F( ) includes a concatenation operation followed by a linear projection layer. In the example described above where index=2 and the function M(2) may return indices {1,3}, the fusion function F( ) may be in the form of:

$$F\left(h_1^T, h_3^T\right) = mul\left(W, \left[h_1^T; h_3^T\right]\right) + b$$

where ";" is a concatenation operator, mul( ) is the matrix multiplication operation, and W and b are learnable parameters. All of the $$h_1^T, h_3^T, \text{ and } h_2^S$$

are d-dimensional vectors where d can be any real positive integer as the CKD is capable of handling dimension mismatches via the mul( ) function.

Figures 3A, 3B, 3C, 3D:
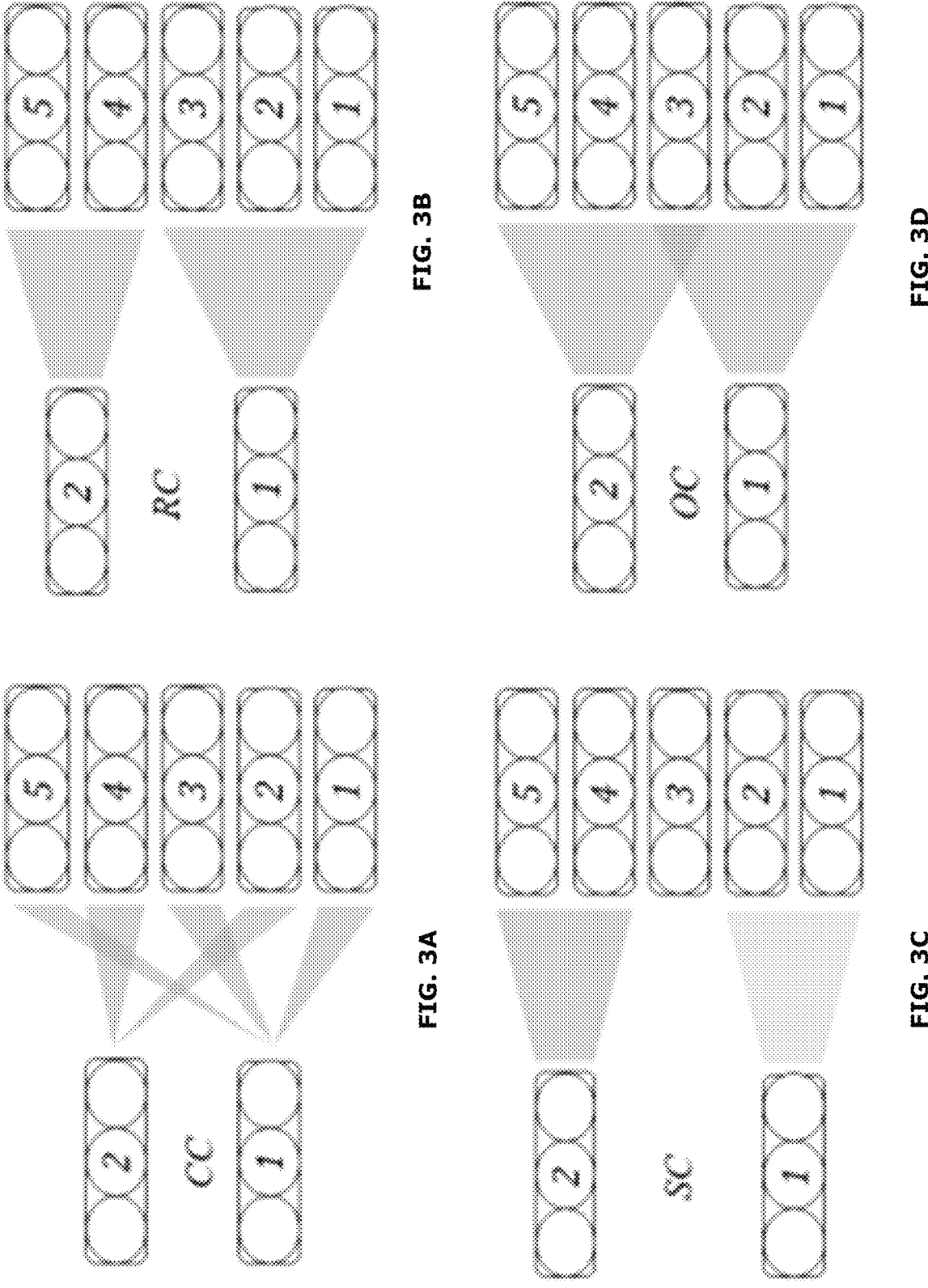
FIG. 3A illustrates a first combination policy also referred to as a cross combination.
FIG. 3B illustrates a second combination policy also referred to as a regular combination.
FIG. 3C illustrates a third combination policy also referred to as a skip combination.
FIG. 3D illustrates a fourth combination policy also referred to as an overlap combination.

The mapping function M( ) defines a combination policy for combining the hidden layers of the teacher 204. FIGS. 3A-D illustrates some example combination policies that may be implemented through mapping function M( ). In particular, each of FIGS. 3A-D illustrates a layer combination policy between a teacher 204 that includes 5 hidden layers and a student 206 that includes 2 hidden layers. FIG. 3A illustrates a first combination policy also referred to as a cross combination (CC), where every m-th hidden layer of the teacher 204 are combined for distillation to corresponding one of the m-layers of the student 206. In the illustrated example, for the student 206 that includes 2 hidden layers, the first $$\left(h_1^T\right),$$

third $$\left(h_3^T\right),$$

and the fifth $$\left(h_5^T\right)$$

hidden layers of the teacher 204 are combined for distillation to the first $$\left(h_1^S\right)$$

hidden layer of the student 206, and the second $$\left(h_2^T\right)$$

and the fourth $$\left(h_4^T\right)$$

hidden layers of the teacher 204 are combined for distillation to the second $$\left(h_2^S\right)$$

hidden layer of the student 206. FIG. 3B illustrates a second combination policy also referred to as a regular combination (RC), where approximately equal number of consecutive hidden layers of the teacher 204 are combined for distillation to a corresponding hidden layer of the student 206. In the illustrated embodiment, the first three hidden layers $$\left(h_1^T, h_2^T, h_3^T\right)$$

of the teacher 204 are combined for distillation to the first hidden layer $$\left(h_1^S\right)$$

of the student 206, and the fourth and fifth hidden layers $$\left(h_4^T, h_5^T\right)$$

of the teacher 204 combined for distillation to the second hidden layer $$\left(h_2^S\right)$$

of the student 206. It is to be understood for an n-layer teacher 204 (i.e. a teacher 204 that includes n hidden layers) and an m-layer student 206 (i.e. a student 206 that include m hidden layers) where n is a multiple of m, even numbered hidden layers of the teacher 204 may be combined for each hidden layer of the student 206. Alternatively, if n is not an exact multiple of m, then a select number of the hidden layers of the student 206 may be associated with more combined hidden layers of the teacher 204 for distillation. FIG. 3C illustrates a third combination policy also referred to as a skip combination (SC), where some hidden layers of the teacher 204 are skipped for distillation. In some embodiments, every (m+1)-th hidden layer of the teacher 204 may be skipped. In some other embodiments, one or more hidden layers of the teacher 204 are skipped such that equal number of the hidden layers of the teacher 204 are combined for distillation to one of the hidden layers of the student 206. In some other embodiments, hidden layers may be skipped at regular or irregular intervals and the remaining hidden layers can then be subdivided and combined for distillation. Any other methods of determining skipping interval may be applied. In the illustrated example, for a student 206 having 2 hidden layers, the third hidden layer $$\left(h_3^T\right)$$

of the teacher 204 is skipped such that the first $$\left(h_1^T\right)$$

and the second $$\left(h_2^T\right)$$

hidden layers of the teacher 204 are combined for distillation to the first $$\left(h_1^S\right)$$

hidden layer of the student 206, and the fourth $$\left(h_4^T\right)$$

and the fifth $$\left(h_5^T\right)$$

hidden layers of the teacher 204 are combined for distillation to the second $$\left(h_2^S\right)$$

hidden layer of the student 206. FIG. 3D illustrates a fourth combination policy also referred to as an overlap combination (OC), where one or more hidden layers of the teacher 204 are combined into multiple groups of hidden layers used for distillation to multiple hidden layers of the student 206. In the illustrated embodiment, the third hidden layer $$\left(h_3^T\right)$$

of the teacher 204 is combined for distillation both of the first and the second hidden layers $$\left(h_1^S, h_2^S\right)$$

of the student 206. In addition to the four combination policies described herein, any other suitable combination policies may be applied. The types of combination policies in CKD may provide flexibility in terms of distilling from different configurations of the hidden layers of the teacher 204. The combination policy may be determined manually (i.e. without attention), or determined automatically by the machine learning system 200 (i.e. with attention).

FIG. 4 illustrates a flowchart for an example knowledge distillation method 400 without attention in accordance with the present disclosure.

At step 402, after initializing values of losses, such as by setting them to 0 (e.g. $\mathcal{L}_{CKD} \leftarrow 0$), a predefined layer mapping function M( ) is used to determine which hidden layers of the teacher 204 are to be combined and associated with which hidden layers of the student 206. Here, to combine layers means combining the output generated by those hidden layers.

At step 404, for each layer $$h_i^s$$

of the student 206, the representation $$f_i^T$$

of the combined hidden layers of the teacher 204 is computed by concatenating the outputs generated by the hidden layers of the teacher 204 to be combined and applying the linear projection via mul(W, Concat($H^T$))+b).

At step 406, both student 204 and teacher 206 are provided with the same input tuple 202 and a final loss value is computed based, in part, on the inferred (i.e. predicted) output of the teacher 204 based on the input of the tuple 202 and the output of the hidden layers of teacher 204.

Figure 5:
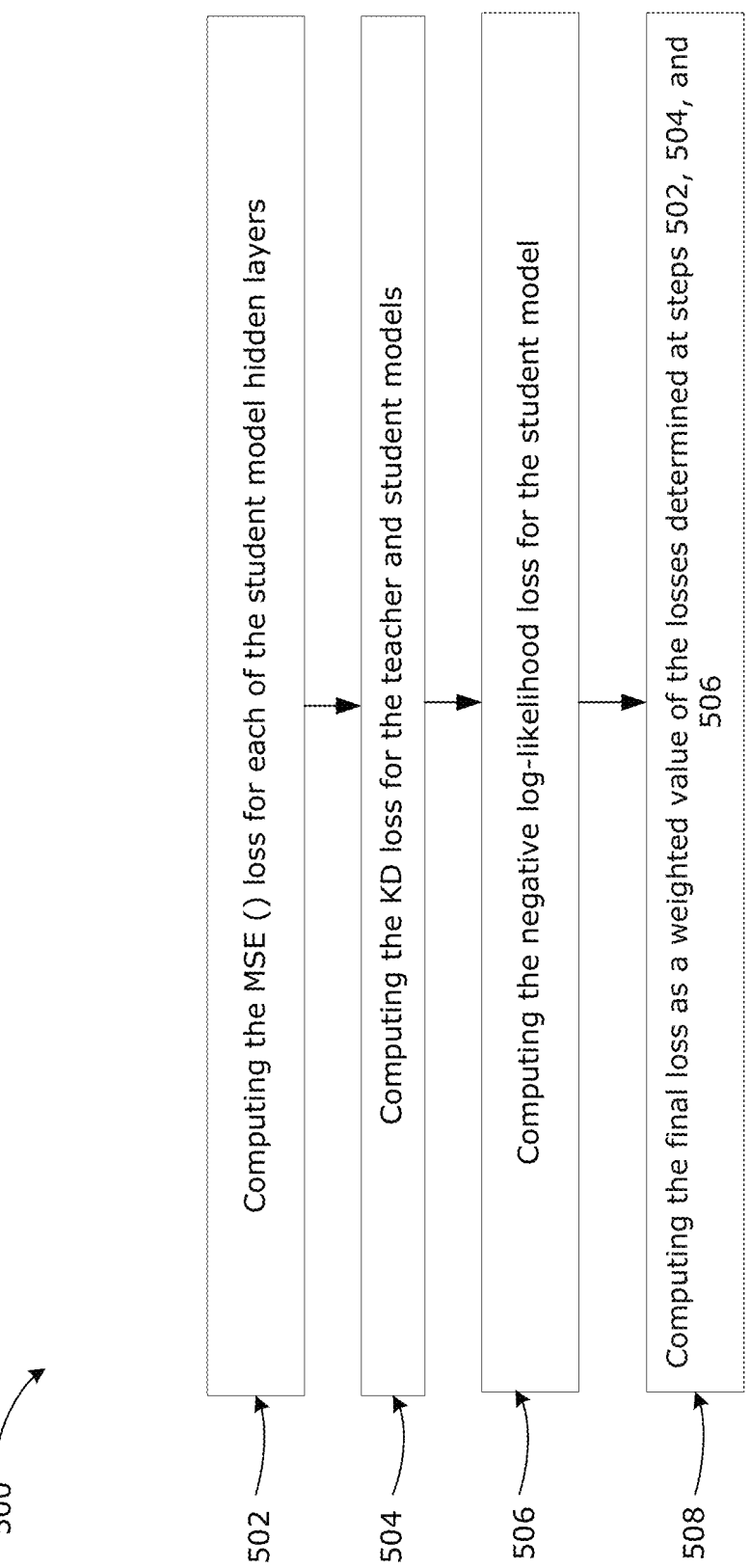
FIG. 5 illustrates a flowchart for an example method of determining a final loss value at step 406 of FIG. 4.

FIG. 5 illustrates a flowchart for an example method 500 of determining a final loss value at step 406.

At step 502, mean squared error (MSE)

$$\left(h_i^s, f_i^T\right)$$

loss (also known as $\mathcal{L}_{CKD}$) is computed for each of the hidden layers of the teacher 204 in accordance with, for example, Equation (4). It is to be understood that the $L_{CKD}$ based on the MSE loss is one of many possible realizations of this loss function, and any valid matrix norms may be used instead of MSE.

At step 504, for both of the student 206 and teacher 204, the KD loss ($\mathcal{L}_{nll}$) is computed in accordance with, for example, Equation (2).

At step 506, for the student, the negative log-likelihood loss ($\mathcal{L}_{nll}$) is computed in accordance with, for example, Equation (1).

At step 508, the final loss is computed as a weighted value of the losses determined at steps 502, 504, and 506 in accordance with Equation (5):

$$\mathcal{L} = \alpha \; \mathcal{L}_{nll} + \beta \; \mathcal{L}_{KD} + \eta \; \mathcal{L}_{CKD} \tag{5}$$

where $\alpha$, $\beta$, and $\eta$ are coefficients that show the contribution of each loss.

Referring back to FIG. 4, at step 408, the gradients with respect to the loss values are computed and are used to update all parameters of the student 206 that contributed to the inferred (i.e. predicted) output y.

At step 410, all loss values are initialized back to their respective initial values, such as zeroes, again and steps 404 to 410 are repeated for further iterations until a completion condition, such as the loss values falling below an acceptable threshold value, is met. FIG. 6 shows an example pseudo code of portions of the method 400.

In some cases, the manually defined combination policy may not present the optimal combination approach to define function M(i) for different hidden layers of the teacher 204. Thus, some further embodiments of the present disclosure provide an augmented CKD method with attention, which may automatically define the optimal policy for combining hidden layers of the teacher 204. Attention-based KD, in at least one aspect, solves the costly problem of searching for hidden layers of the teacher 204 to be combined. Specifically, PKD and other similar methods may need to train several students 206 to search for hidden layers of the teacher 204 that should be skipped during training and in cases where the teacher 204 is a deep neural network model it may time consuming to find the best/optimal solution, if at all.

In some embodiments, attention weights may be learned between each of the respective hidden layers ($H^S$) of the student 206 and hidden layers ($H^T$) of the teacher 204. Each attention weight may be an indication of how much a hidden layer of the teacher 204 contributes to the knowledge distillation process of a given hidden layer of the student 206. The attention weights can then be optimized by the machine learning system 200 in an attempt to achieve the optimal knowledge distillation between the hidden layers of the teacher 204 and the hidden layers of the student 206.

Figure 7:
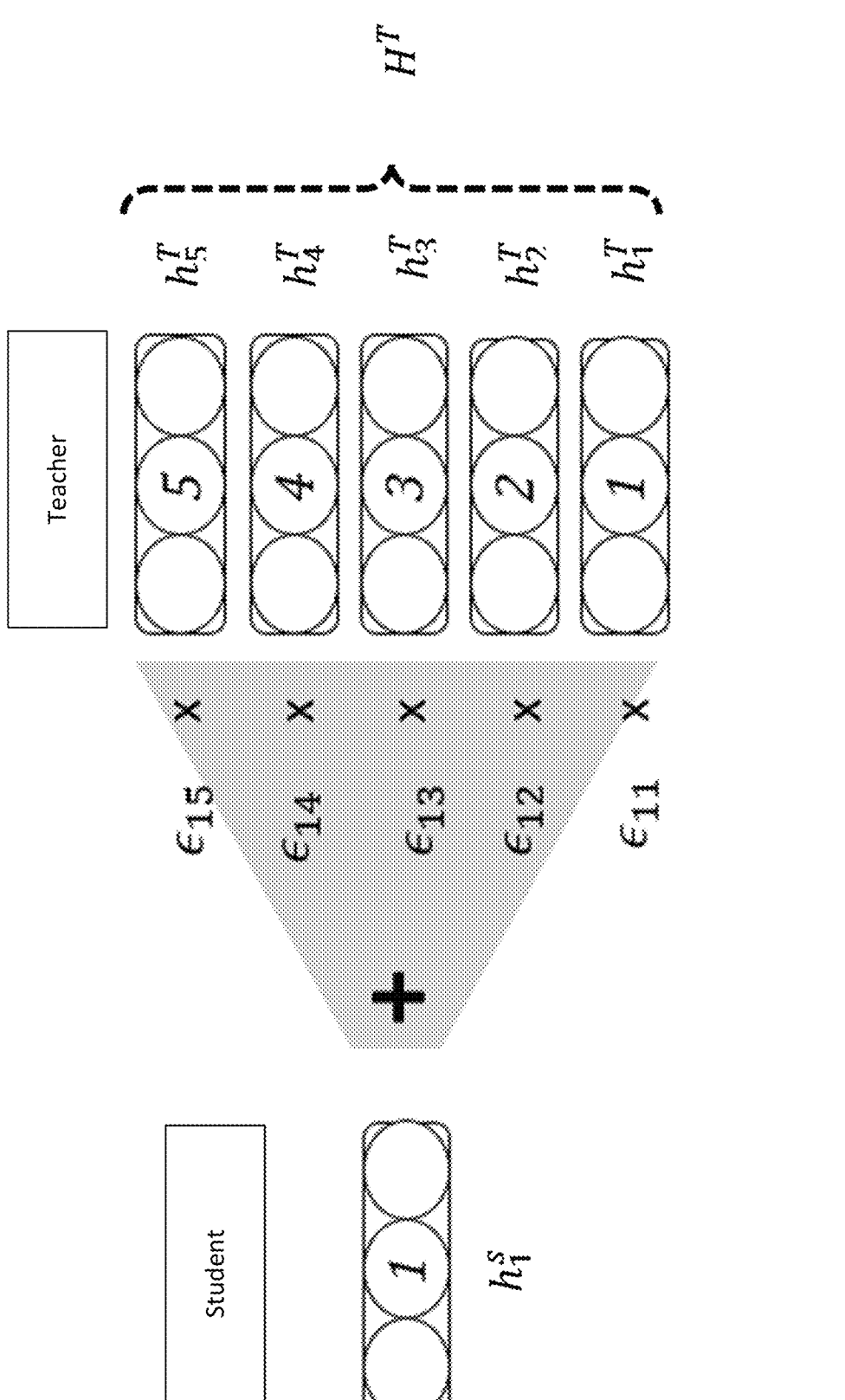
FIG. 7 illustrates a high-level schematic architecture of the augmented CKD with attention.

FIG. 7 illustrates a high-level schematic architecture of the augmented CKD with attention, or may be noted as CKD* herein. As shown in FIG. 7, the combination policy may not need to be manually defined via M( ) for knowledge distillation in CKD*, but instead CKD* takes all of the hidden layers $$\left(h_1^T \text{ to } h_5^T\right)$$

of the teacher 204 into consideration and assigns an attention weight ($\epsilon_{11}$, $\epsilon_{12}$, $\epsilon_{13}$, $\epsilon_{14}$, and $\epsilon_{15}$) to each of the hidden layers $$\left(h_1^T \text{ to } h_5^T\right)$$

of the teacher 204. The attention weight is indicative of the amount of contribution of a particular output generated by a hidden layer of the teacher 204 is to be used during distillation for a given hidden layer of the student 206. The output tensor of each hidden layer of the teacher 204 may be applied with its corresponding attention weight to compute a weighted average of the output of all the hidden layers of the teacher 204. The weighted average is a tensor that may be connected to a hidden layer of the student 206 for knowledge distillation therein between. The total loss is formulated as per Equation (6):

$$\mathcal{L}_{CKD^*}\left(H^s, H^T\right) = \sum_{h_i^s \in H^s} MSE\left(h_i^s, f_i^{*T}\right) \tag{6}$$

where the MSE loss is one of the many possible realizations of the loss function $$\mathcal{L}_{CKD^*}\left(\,\right),$$

and any other suitable loss functions such as KL Divergence may also be used. The $$f_i^{*T}$$

is the combined attention-based representation of the hidden layers ($H^T$) of the teacher 204 for the $i^{th}$ hidden layer of the teacher 204 and, for embodiments where student 206 and teacher 204 have identical dimensions $$\left(|h_i^s| = |h_j^T|\right), f_i^{*T}$$

may be determined as per Equation 7A:

$$f_i^{*T} = \sum_{h_j^T \in H^T} \epsilon_{ij} h_j^T \tag{7A}$$

Alternatively, for embodiments where the student 206 and the teacher 204 have different dimensions $$\left(|h_i^s| \neq |h_j^T|\right), f_i^{*T}$$

may be determined as per Equation 7B:

$$f_i^{*T} = \sum_{h_j^T \in H^T} \epsilon_{ij}\left(W_i h_j^T\right) \tag{7B}$$

where $$W_i \in \mathbb{R}^{|h_i^s| \times |h_j^T|}$$

and is the weight value for the $i^{th}$ hidden layer of the teacher 204, indicative of the amount of contribution, and therefore the relative importance, of different hidden layers $$\left(h_j^T\right)$$

of the teacher 204 in the knowledge transfer process for each specific hidden layer $$\left(h_i^s\right)$$

of the student 206. The attention weights ($\epsilon_{ij}$) should sum up to 1 and may be computed in accordance with Equation (8A):

$$\epsilon_{ij} = \frac{e^{\varphi_{ij}}}{\sum_{k=1}^{k=|H^T|} e^{\varphi_{ik}}} \tag{8A}$$

where $$\varphi_{ij} = \Phi\left(h_i^s, h_j^T\right)$$

is an energy score between the output generated by the $i^{th}$ hidden layer of the student $$h_i^s$$

and the output generated by the $i^{th}$ hidden layer of the teacher $$\left(h_j^T\right),$$

the energy score being indicative of a similarity between the two generated outputs, $$\varphi_{ik} = \Phi\left(h_i^s, h_k^T\right)$$

is an energy score between the output generated by the $i^{th}$ hidden layer of the student $$\left(h_i^s\right)$$

and the output generated by the $k^{th}$ hidden layer of the teacher $$\left(h_k^T\right),$$

the energy score being indicative of a similarity between the two generated outputs, $\Phi(h^S, h^T)$ is an energy function of an output generated by a hidden layer of the student and an output generated by a hidden layer of the teacher, $$h_k^T$$

where $k \in \{1, \ldots, |H^T|\}$ is a $k^{th}$ layer of the teacher that belongs to the set $H^T$, $H^T$ is the set of all hidden layers of the teacher, and $|H^T|$ is the size of the set $H^T$ representing the total number of hidden layers of the teacher.

The energy function $$\Phi\left(h_i^s, h_j^T\right)$$

is a function as per Equation (8B):

$$\varphi_{i,j} = \Phi\left(h_i^s, h_j^T\right) \tag{8B}$$

where $\varphi_{ij}$ determines an energy score between the output generated by the $i^{th}$ hidden layer $$h_i^s$$

of the student 206, and the output generated by the $j^{th}$ hidden layer $$h_j^T$$

of the teacher 204, where the energy score is indicative of a similarity between the two generated outputs.

In some embodiments where the student 206 and teacher 204 have identical dimensions $$\left(|h_i^s| = |h_j^T|\right),$$

the energy function $$\Phi\left(h_i^s, h_j^T\right)$$

is a dot product of the output of the $i^{th}$ hidden layer $$h_i^s$$

of the student 206 and the output generated by the $j^{th}$ hidden layer $$h_j^T$$

of the teacher 204 as per Equation (9A):

$$\Phi\left(h_i^s, h_j^T\right) \equiv \left\langle h_i^s, h_j^T\right\rangle \tag{9A}$$

Alternatively, in embodiments where there is a dimension mismatch between the student and the teacher $$\left(|h_i^s| \neq |h_j^T|\right),$$

the energy function $$\Phi\left(h_i^s, h_j^T\right)$$

may be computed as the dot product of the output of the $i^{th}$ hidden layer $$h_i^s$$

of the student 206 and the weighted value of the output generated by the $j^{th}$ hidden layer $$h_j^T$$

of the teacher 204 per Equation (9B):

$$\Phi\left(h_i^s, h_j^T\right) \equiv \left\langle h_i^s, W_i h_j^T\right\rangle. \tag{9B}$$

The dot product based energy function may permit any potential dimension mismatch between the outputs of two hidden layers to be handled through additional projection layers as described in more detail below.

FIG. 8 illustrates a flowchart for an example knowledge distillation method 800 with attention in accordance with the present disclosure.

At step 802, values of losses are initialized, such as by setting them to $$0 \text{ (e.g. } \mathcal{L}_{CKD} \leftarrow 0).$$

Unlike method 400, the layer mapping function M( ) does not need to be explicitly defined. Instead, for each hidden layer of the student 206, a weight value is assigned to a subset of the hidden layers of the teacher 204. In some embodiments, the subset of the hidden layers of the teacher 204 may include all of the hidden layers of the teacher 204. Conceptually, the weight values may serve as an implicit mapping of the hidden layers of the teacher 204 to each of the hidden layers of the student 206.

At step 804, for each student layer $$h_i^s,$$

a weighted average of the subset of the teacher hidden layers $$f_i^T$$

is computed as a representation of the teacher hidden layers by multiplying each teacher hidden layer output by its corresponding weight value in accordance with Equation (6).

At step 806, both student 206 and teacher 204 are provided with the input vector (x) of the same tuple 202 and a final CKD* loss value is computed based, in part, on the inferred (i.e. predicted) outputs of the teacher and the student 206 based on the input vector (×) of the tuple 202 in accordance with, for example, method 500.

At step 808, the gradients with respect to the loss values are computed and the computed gradients are used to update all parameters of the student 206.

At step 810, all loss values are initialized back to their respective initial values, such as zeroes, again and steps 804 to 810 are repeated for further iterations until a completion condition, such as the loss values falling below an acceptable threshold value, is met.

It is to be understood that although embodiments of CKD* utilizing a weighted average of all hidden layers of the teacher 204 for the knowledge transfer to each hidden layer of the student 206 is described herein, other embodiments of the CKD* may utilize a weighted average of a portion of the hidden layers of teacher 204. Additionally, there may be overlapping a subset of hidden layers of the teacher that are combined for different hidden layers of the student 206. For example, one-half of the hidden layers of the teacher 204 may be used for combining for one-half of the hidden layers of the student 206 with no overlap. Alternatively, two-thirds of the hidden layers of the teacher 204 (i.e. $1^{st}$ ⅓ and $2^{nd}$ ⅓ of the hidden layers of teacher 204) may be used for combining for one-half of the hidden layers of the student, and another two thirds ($2^{nd}$ ⅓ and the $3^{rd}$ ⅓ of the hidden layers of the teacher 204 may be used for combining for the other half of the hidden layers of the student 206 with a partial overlap.

Advantageously, the CKD* method described above may enable automatic teacher hidden layer mapping selection that may achieve an optimal knowledge transfer. In some embodiments, the CKD* method may improve upon the performance for BERT and neural machine translation models. FIG. 9 illustrates a table showing simulation results of the various KD models in performing General Language Understanding Evaluation (GLUE) benchmarks known in the art, including Question Natural Language Inference (QNLI) with 105, 000 data points, Microsoft Research Paraphrase Corpus (MRPC) with 3,700 data points, and Recognizing Textual Entailment (RTE) with 2,500 data points. In the table shown in FIG. 9, "T" denotes teacher, which was a BERT based model with 12 hidden layers, 12 attention heads, and a hidden size of 768. All students 206 were BERT_4 models with 4 hidden layers, 12 attention heads, and a hidden size of 768. Of the students 206, "NKD" denotes no KD, "KD" denotes regular prior art KD. The last three columns of the table are students applied with CKD* with no attention overlap (i.e. T[1,2,3,4]->S1, T[5,6,7,8]->S2, T[9,10,11, 12]->S3, partial attention overlap (i.e. T[1,2,3,4,5]->S1, T [5,6,7,8,9]->S2, T[9,10,11,12]->S3), and full attention overlap (i.e. all 12 hidden layers of the teacher 204 used for combing for each hidden layer of the student 206), respectively. As shown, CKD* with no attention overlap achieved a score of 87.11, outperforming the rest of the students for the QNLI benchmark, and CKD* with fully attention overlap achieved a score of 67.15, outperforming all other students 206 in the RTE benchmark. With a score of 80.72, CKD* with fully attention overlap outperforms all other students in the MRPC benchmark.

In some further embodiments, the attention-based CKD* method described herein may be applied to multi-teacher/ multi-task KD scenarios as well. Specifically, instead of combining different hidden layers of a single teacher 204 through attention, the CKD* method may be applied to combine different hidden layers from different teacher's 204 for knowledge distillation into one student 206.

At least some of the prior art KD methods iterate through multiple teacher's 204 in different training iterations and consider them independently as disclosed in "*Bam! born-again multi-task networks for natural language understanding*", Clark, K., Luong, M. T., Khandelwal, U., Manning, C. D., & Le, Q. V. (2019). For example, with K different teachers 204 trained with K different training data sets $$\mathcal{D}_q = \{(x_i^q, y_i^q)\}_{i=1}^{N_q}, 1 \le q \le K$$

where $N_q$ specifies the number of training data samples in the training dataset for the $q^{th}$ teacher 204. The prior art solution described above for training a student 206 with multiple teachers 204, and particularly the KD loss ($\mathcal{L}_{KD}^q$) between the $q^{th}$ teacher $T_q$ and the student S may be mathematically characterized as follows:

$$\mathcal{L}_{KD} = \sum_{q=1}^{K} \mathcal{L}_{KD}^q = \sum_{q=1}^{K} \sum_{x_i^q \in \mathcal{D}_q} L_{KD}\left(T_q(x_i^q), S(x_i^q)\right)$$

where the terms $$T_q(x_i^q) \text{ and } S(x_i^q)$$

give the inferred (i.e. predicted) outputs of the $q^{th}$ teacher $T_q$ and the student S, respectively. The KD loss values of each teacher $$T_q(\mathcal{L}_{KD}^q)$$

may be determined as:

$$\mathcal{L}_{KD}^{q} = \sum_{x_i^q \in \mathcal{D}_q} L_{KD}\big(T_q(x_i^q), S(x_i^q)\big)$$

where $L_{KD}$ can be any loss function such as Kullback-Leibler (KL) divergence or mean square error. To compute $$L_{KD}\big(T_q(x_i^q), S(x_i^q)\big),$$

data samples $$\{(x_i^q)\}_{i=1}^{N_q}$$

of the training dataset are sent to the $q^{th}$ teacher $T_q$ and the student S to obtain their respective inferred (i.e. predicted) outputs.

For embodiments in accordance with the present disclosure, the above multi-teacher is extended with the CKD/CKD* approach as per Equation (10):

$$\mathcal{L}_{KD}^{*q} = \sum_{p=1}^{p=K} \sum_{x_i^q \in \mathcal{D}_q} \epsilon_{pq} L_{KD}\big(T_p(x_i^q), S(x_i^q)\big) \qquad (10)$$

where the weight values $\epsilon_{pq}$ of the hidden layers of each teacher $T_p$ may be determined in accordance with Equation (11A):

$$\epsilon_{pq} = \frac{e^{\varphi_{pq}}}{\sum_{i=1}^{K} e^{\varphi_{iq}}} \qquad (11A)$$

In some embodiments, the $\Phi(.)$ function is a dot product of two input vectors ($\times$) for measuring the energy, or similarity, between the two input vectors ($\times$) as may be computed as per Equation 11(B):

$$\varphi_{pq} = \Phi\big(T_p(x_i^q), S(x_i^q)\big); \qquad (11B)$$
$$x_i^q \in \mathcal{D}_q$$

In some further embodiments, the $\Phi(.)$ function is a neural network or any other suitable function for measuring the energy of two input vectors (x).

Figure 10:
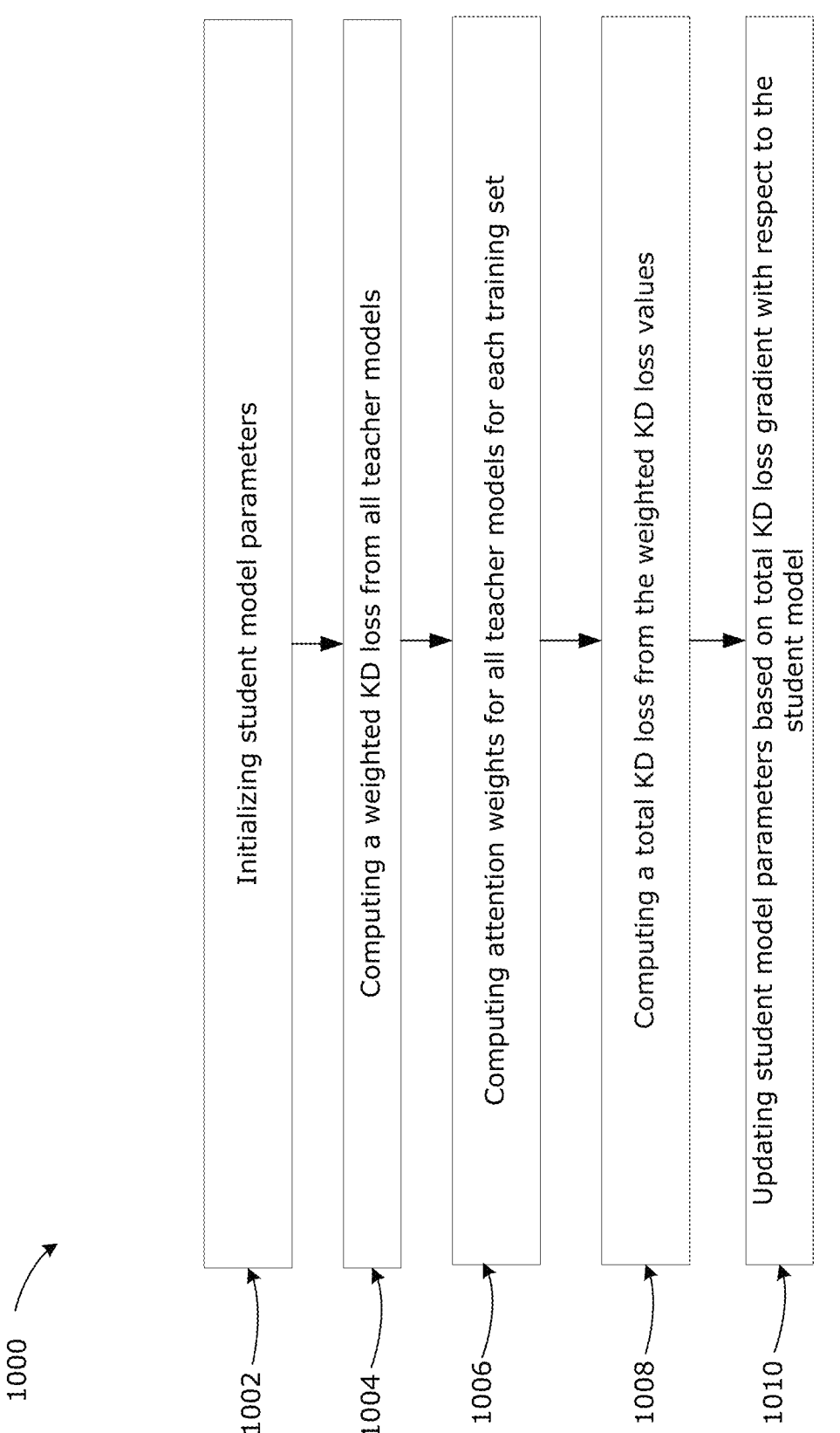
FIG. 10 illustrates a flowchart for an example method for knowledge distillation from multiple teachers to one teacher in accordance with the present disclosure.

FIG. 10 illustrates a flowchart for an example method 1000 for knowledge distillation from multiple teachers' 204 to one student 206 in accordance with the present disclosure.

At step 1002, parameters of each of the teacher's 204 including the attention weights of the hidden layers of each of the teacher's 204 are initialized.

At step 1004, the training dataset is provided to each teacher 204 as $$\mathcal{D}_q = \{(x_i^q, y_i^q)\}_{i=1}^{N_q},$$
$$1 \le q \le K,$$

a weighted KD loss based on a loss computed for each of the teacher's 204 is computed as per Equation (12):

$$\mathcal{L}_{KD}^{*q} = \sum_{p=1}^{p=K} \sum_{x_i^q \in \mathcal{D}_q} \epsilon_{pq} L_{KD}\big(T_p(x_i^q), S(x_i^q)\big) \qquad (12)$$

Where $L_{KD}$ can be any suitable loss function, including KL divergence or mean squared error (MSE). To compute $$L_{KD}\big(T_q(x_i^q), S(x_i^q)\big),$$

data samples of the training dataset $$\{(x_i^q)\}_{i=1}^{N_q}$$

are provided as input to the $q^{th}$ teacher 204 and the student 206 to obtain the inferred (i.e. predicted) outputs of the $q^{th}$ teacher 204 and the student 206.

Figure 11:
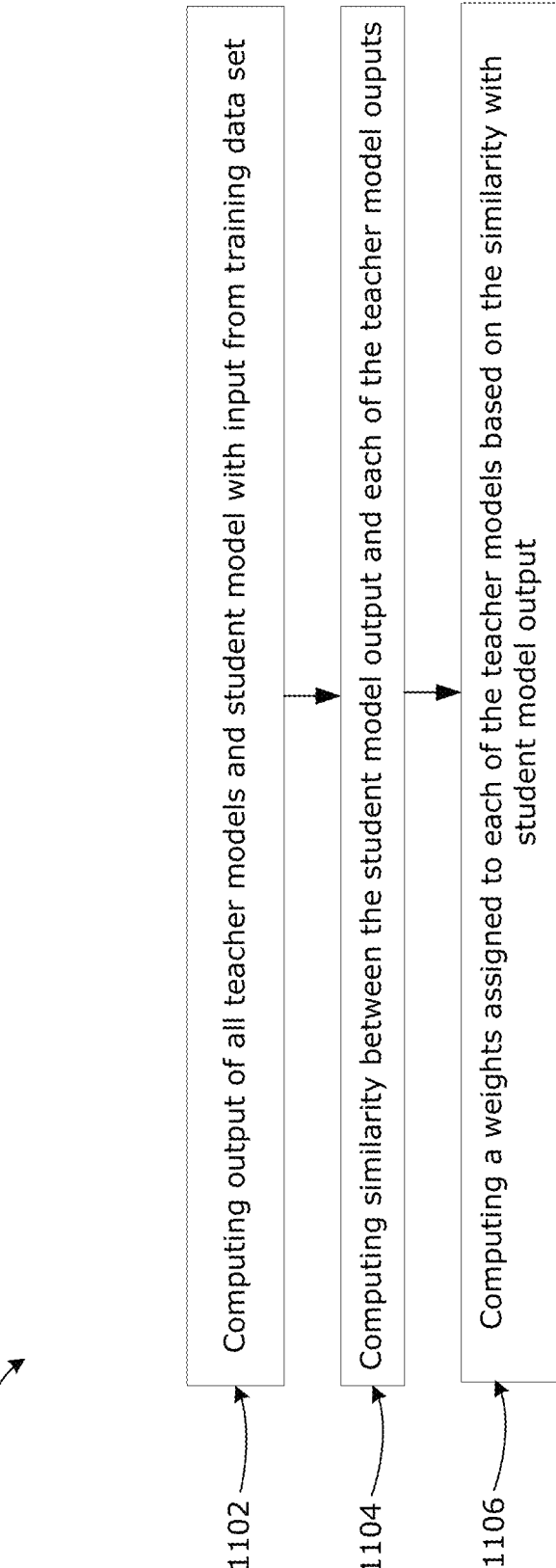
FIG. 11 shows a flowchart of an example method for calculating the attention weights that may be implemented at step 1006 of the method shown in FIG. 10.

At step 1006, for each training data set q, the attention weights of all K teachers 204 (i.e. the set of $\{\epsilon_{1q}, \epsilon_{2q}, \ldots, \epsilon_{Kq}\}$, where $$\sum_{i=1}^{K} \epsilon_{1q} = 1)$$

are computed. FIG. 11 shows a flowchart of an example method 1100 for computing the attention weights that may be implemented at step 1006.

At step 1102, $$x_i^q$$

of the training dataset is provided as input to all the teachers 204 and the student 206 to obtain get their respective inferred (i.e., predicted) outputs.

At step 1104, the energy/similarity is computed between the output vector $$S(x_i^q)$$

of the student 206 and the output vector $$T_p(x_i^q)$$

of each teacher 204 using the function $$\varphi_{pq} = \Phi(T_p(x_i^q), S(x_i^q)).$$

In some embodiments, the function $\phi$ can be a simple dot product function between its two vector inputs.

At step 1106, the weights $\epsilon_{pq}$ that should be assigned to each of the teachers 204 is computed based on the similarity with the inferred (i.e., predicted) output of the teacher 204 using, for example, $$\epsilon_{pq} = \frac{e^{\varphi_{pq}}}{\sum_{i=1}^{K} e^{\varphi_{iq}}}.$$

Referring back to FIG. 10, at step 1008, the weight KD losses $\mathcal{L}_{KD}^{q}$ for all K teachers 204 are summed up as the total KD loss of the teachers 204 at each time step. It is to be understood that although embodiments described herein includes $\mathcal{L}_{KD}$ loss, in some other embodiments, depending on the design of each problem, training loss functions other than $\mathcal{L}_{KD}$ may also be applicable.

At step 1010, a total KD loss gradient with respect to the parameters of the teacher 204 is computed and the parameters of the student 206 are updated.

In some embodiments, method 1000 extends CKD* as described herein to multiple teacher knowledge distillation scenarios. This may permit multi-task distillation, multilingual distillation, multi-checkpoint distillation and any other applications for which knowledge distillation from multiple teachers to a single student is desired.

Figure 12:
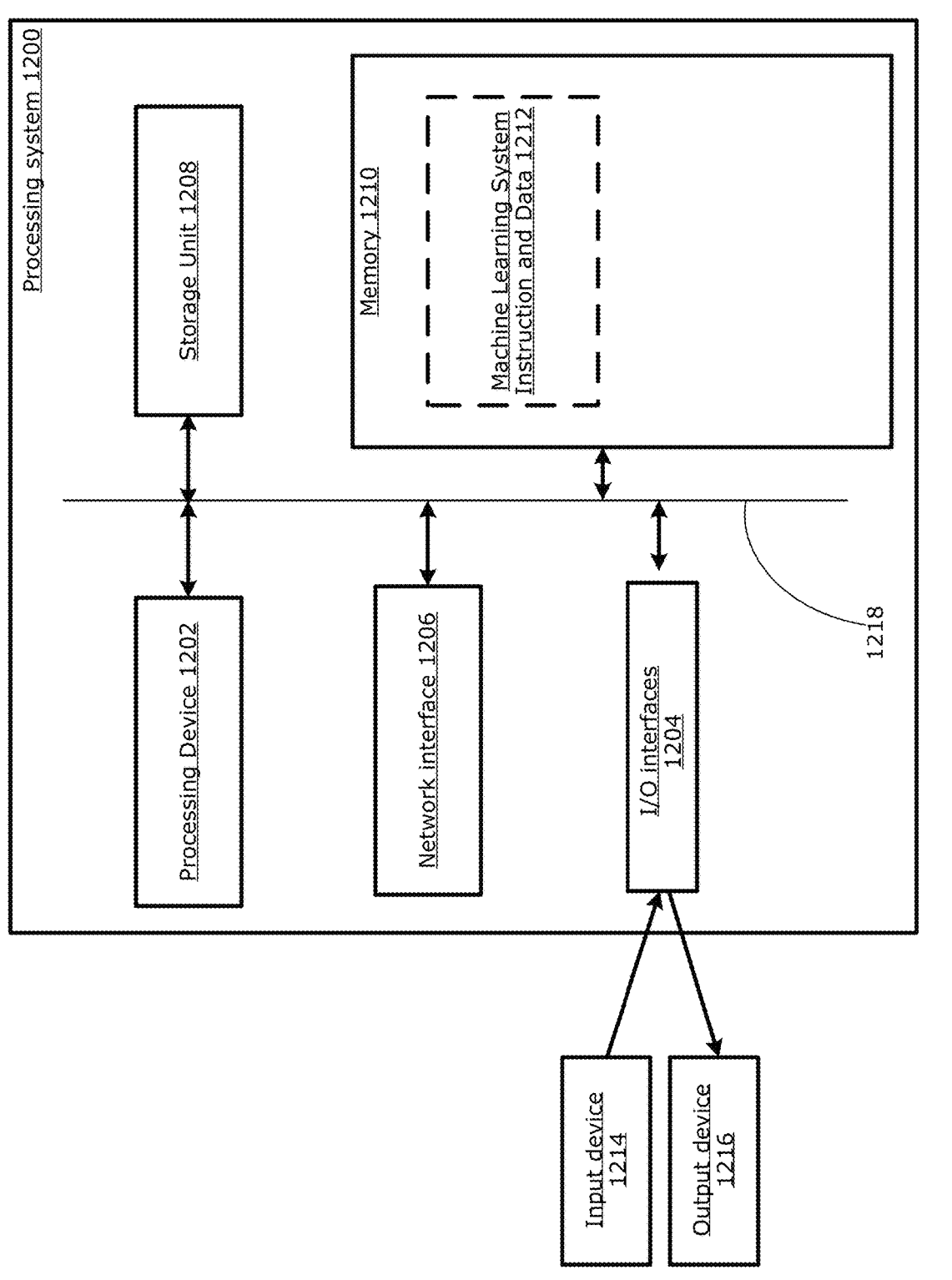
FIG. 12 shows a block diagram of an example simplified processing system which may be used to implement embodiments disclosed herein.

Referring to FIG. 12, a block diagram of an example simplified processing system 1200, which may be used to implement embodiments disclosed herein, and provides a higher level implementation example. The teacher 204 and student 206, as well as other functions included in machine learning system 200 may be implemented using the example processing system 1200, or variations of the processing system 1200. The processing system 1200 could be a terminal, for example, a desktop terminal, a tablet computer, a notebook computer, AR/VR, or an in-vehicle terminal, or may be a server, a cloud end, or any suitable processing system. Other processing systems suitable for implementing embodiments described in the present disclosure may be used, which may include components different from those discussed below. Although FIG. 12 shows a single instance of each component, there may be multiple instances of each component in the processing system 1200.

The processing system 1200 may include one or more processing devices 1202, such as a graphics processing unit, a processor, a microprocessor, an application-specific integrated circuit (ASIC), a field-programmable gate array (FPGA), a dedicated logic circuitry, accelerator, a tensor processing unit (TPU), a neural processing unit (NPU), or combinations thereof. The processing system 1200 may also include one or more input/output (I/O) interfaces 1204, which may enable interfacing with one or more appropriate input devices 1214 and/or output devices 1216. The processing system 1200 may include one or more network interfaces 1206 for wired or wireless communication with a network.

The processing system 1200 may also include one or more storage units 1208, which may include a mass storage unit such as a solid state drive, a hard disk drive, a magnetic disk drive and/or an optical disk drive. The processing system 1200 may include one or more memories 1210, which may include volatile or non-volatile memory (e.g., a flash memory, a random access memory (RAM), and/or a read-only memory (ROM)). The non-transitory memory of memory 1210 may store instructions for execution by the processing device(s) 1202, such as to carry out examples described in the present disclosure, for example, CKD/CKD* instructions and data 1212 for machine learning system 200. The memory(ies) 1210 may include other software instructions, such as for implementing an operating system for the processing system 1200 and other applications/functions. In some examples, one or more data sets and/or modules may be provided by an external memory (e.g., an external drive in wired or wireless communication with the processing system 1200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The processing system 1200 may also include a bus 1218 providing communication among components of the processing system 1200, including the processing device(s) 1202, I/O interface(s) 1204, network interface(s) 1206, storage unit(s) 1208 and/or memory(ies) 1210. The bus 1218 may be any suitable bus architecture including, for example, a memory bus, a peripheral bus or a video bus.

The computations of the teacher 204 and student 206 may be performed by any suitable processing device 1202 of the processing system 1200 or variant thereof. Further, the teacher 204 and the student 206 may be any suitable neural network model, including variations such as recurrent neural network models, long short-term memory (LSTM) neural network models.

General

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of knowledge distillation from a teacher neural model having a plurality of teacher hidden layers to a student neural model having a plurality of student hidden layers, the method comprising:

training the teacher neural model, wherein the teacher neural model is configured to receive a training input and generate a teacher output for the training input; and training the student neural model on a plurality of training inputs, wherein the student neural model is configured to receive inputs and generate a corresponding student output, comprising:

processing each training input using the teacher neural model to generate the teacher output for the training input, each of the plurality of teacher hidden layers generating a teacher hidden layer output to obtain a plurality of teacher hidden layer outputs;

mapping a subset of the plurality of teacher hidden layers to each of the plurality of student hidden layers;

calculating, for each of the plurality of student hidden layers, a representation of the teacher hidden layer outputs of the subset of the plurality of teacher hidden layers mapped to each of the plurality of student hidden layers; and training the student to, for each of the training inputs, generate a student output that approximates the teacher output for the training input, wherein each of the plurality of student hidden layers, for each of the training inputs, is trained to generate a student hidden layer output that approximates the representation of the subset of the plurality of teacher hidden layers mapped to the each of the plurality of student hidden layers, wherein the mapping comprises, for each of the student hidden layers, assigning an attention weight ($\epsilon_{ij}$) to the teacher hidden layer output of each of the subset of the plurality of teacher hidden layers, wherein each attention weight ($\epsilon_{ij}$) is computed by:

$$\epsilon_{ij} = \frac{e^{\varphi_{ij}}}{\sum_{k=1}^{k=|H^T|} e^{\varphi_{ik}}}$$

where $$\varphi_{ij} = \Phi\left(h_i^s, h_j^T\right)$$

is an energy score between an output generated by an $i^{th}$ hidden layer of the student $$\left(h_i^s\right)$$

and an output generated by a $j^{th}$ hidden layer of the teacher $$\left(h_j^T\right),$$

the energy score being indicative of a similarity between the two generated outputs, $$\varphi_{ik} = \Phi\left(h_i^s, h_k^T\right)$$

is an energy score between the output generated by the $i^{th}$ hidden layer of the student $$\left(h_i^s\right)$$

and an output generated by the $k^{th}$ hidden layer of the teacher $$\left(h_k^T\right),$$

the energy score being indicative of a similarity between the two generated outputs,
$\Phi(h^S, h^T)$ is an energy function of an output generated by a hidden layer of the student and an output generated by a hidden layer of the teacher, $$h_k^T$$

where $k \in \{1, \ldots, |H^T|\}$ is a $k^{th}$ layer of the teacher that belongs to a set of all hidden layers of the teacher ($H^T$), and $|H^T|$ is a size of the set $H^T$ representing a total number of hidden layers of the teacher.

2. The method of claim 1, further comprising training the student to, for each of the training inputs, generate the student output to approximate a ground truth of the training input.

3. The method of claim 1, wherein training the student to generate the student output that approximates the teacher output for the training input further comprises:

computing a knowledge distillation (KD) loss between the student output and the teacher output;

computing a standard loss between the student output and the ground truth;

computing a combinatorial KD (CKD) loss between each of the plurality of student hidden layers and the subset of the teacher hidden layers mapped to each of the plurality of student layer;

calculating a total loss as a weighted average of the KD loss, the standard loss and the CKD loss; and adjusting parameters of the student to minimize the total loss.

4. The method of claim 3, wherein the CKD loss is computed by:

$$L_{CKD} = \sum_{h_i^s \in H^s} MSE\left(h_i^s, f_i^T\right)$$

where $L_{CKD}$ is the CKD loss,

MSE( ) is a mean-square error function, $$h_i^s$$

is the output generated by the i$^{th}$ hidden layer of the student, $$f_i^T$$

is an output generated by the subset of hidden teacher layers which are associated with or assigned to the i$^{th}$ hidden layer of the student by a mapping function $\underline{M}$ which is computed by $$f_i^T = F(H^T(i)), \text{ where } H^T(i) = \{j \in M(i)\},$$

F( ) is a fusion function that fuses/aggregates a subset of hidden teacher layers which are assigned to a particular hidden layer of the student model provided by a first $$(h_1^T)$$

and third $$(h_3^T)$$

hidden layers of the teacher,
an output of F( ) being mapped to a second hidden layer of the student $$(h_2^s),$$

$H^S$ is a set of all hidden layers of the student
$H^T$ is the set of all hidden layers of the teacher,
$H^T(i)$ is a subset of hidden layers of the teacher selected mapped to the i$^{th}$ hidden layer of the student, and
M( ) is a mapper function that takes an index referencing to the hidden layer of the student and returns a set of indices for the teacher.

5. The method of claim 4, wherein the fusion function F( ) includes a concatenation operation followed by a linear projection layer.

6. The method of claim 5, wherein the fusion function F( ) is defined by:

$$F(h_1^T, h_3^T) = mul(W, [h_1^T; h_3^T]) + b$$

where
";" is a concatenation operator,
mul( ) is the matrix multiplication operation, and
W and b are learnable parameters.

7. The method of claim 4, wherein the mapping function M( ) defines a combination policy for combining the hidden layers of the teacher.

8. The method of claim 7, wherein the combination policy is any one of overlap combination, regular combination, skip combination, and cross combination.

9. The method of claim 1, wherein the mapping further comprises, defining a combination policy for mapping the teacher hidden layers to each of the plurality of student hidden layers.

10. The method of claim 9, wherein the combination policy is any one of overlap combination, regular combination, skip combination, and cross combination.

11. The method of claim 3, wherein the CKD loss is computed by:

$$L_{CKD} * (H^S, H^T) = \sum_{h_i^s \in H^s} MSE(h_i^s, f_i^{*T})$$

where
$L_{CKD*}$ is the CKD loss,
MSE( ) is a mean-square error function, $$h_i^s$$

is the output generated by the i$^{th}$ hidden layer of the student, $$f_i^{*T}$$

is a combined attention-based representation of the set of all hidden layers ($H^T$) of the teacher for an i$^{th}$ hidden layer of the teacher, and $H^S$ is a set of all hidden layers of the student.

12. The method of claim 11, wherein the student output and the teacher output have identical dimensions $$(|h_i^s| = |h_i^T|), \text{ and } f_i^{*T}$$

is computed by:

$$f_i^{*T} = \sum_{h_j^T \in H^{*T}} \epsilon_{ij} h_j^T$$

where
$\epsilon_{ij}$ is the attention weight, and the attention weight indicates how much the j$^{th}$ hidden layer of the teacher $$(h_j^T)$$

contributes to the knowledge distillation process of the $i^{th}$ hidden layer of the student $$\left(h_j^s\right),$$

$$h_j^T$$

is a $j^{th}$ hidden layer of the teacher, and
$H^{*T}$ is the set of all hidden layers from the teacher that is assigned to the $i^{th}$ hidden layer of the student.

13. The method of claim 11, wherein the student output and the teacher output have different dimensions $$\left(|h_i^s| \neq |h_j^T|\right), \text{ and } f_i^{*T}$$

is computed by:

$$f_i^{*T} = \sum_{h_j^T \in H^T} \epsilon_{ij}\left(W_i h_j^T\right)$$

where
$\epsilon_{ij}$ is the attention weight, and the attention weight indicates how much the $j^{th}$ hidden layer of the teacher $$\left(h_j^T\right)$$

contributes to the knowledge distillation process of the $i^{th}$ hidden layer of the student $$(h_i^s),$$

$$h_j^T$$

is a $j^{th}$ hidden layer of the teacher,
$H^T$ is the set of all hidden layers of the teacher that is assigned to the $i^{th}$ hidden layer of the student, and $$W_i \in R^{|h_i^s| \times |h_j^T|}$$

and is a weight value for the $i^{th}$ hidden layer of the teacher.

14. The method of claim 13, wherein a sum of all attention weights $\epsilon_{ij}$ is 1.

15. The method of claim 1, wherein the energy function $$\Phi\left(h_i^s, h_j^T\right)$$

is computed as the dot product of the output of the $i^{th}$ hidden layer of the student $$(h_i^s)$$

and the output generated by the $j^{th}$ hidden layer of the teacher $$\left(h_j^T\right)$$

by:

$$\Phi\left(h_i^s, h_j^T\right) \equiv \ < h_i^s, h_j^T > .$$

16. The method of claim 15, wherein the energy function $$\Phi\left(h_i^s, h_j^T\right)$$

is computed as the dot product of the output of the $i^{th}$ hidden layer of the student $$(h_i^s)$$

and a weighted value of the output generated by the $j^{th}$ hidden layer of the teacher $$\left(W_i h_j^T\right)$$

by:

$$\Phi\left(h_i^s, h_j^T\right) \equiv \ < h_i^s, W_i h_j^T > .$$

17. A method of knowledge distillation from a plurality of teacher neural models each having a plurality of teacher hidden layers to a student neural model having a plurality of student hidden layers, the method comprising:

inferring the plurality of teacher neural models, wherein each of the plurality of the teacher neural models is configured to receive an input and generate a teacher output; and training the student neural model on a plurality of training inputs, wherein the student neural model is configured to receive inputs and generate a student output, comprising:

processing each training input using the plurality of teacher neural models to generate a plurality of teacher outputs for the training input, each of the plurality of teacher hidden layers of each of the plurality of teacher neural models generating a teacher hidden layer output;

mapping a subset of the plurality of teacher hidden layers of the plurality of teacher neural models to each of the plurality of student hidden layers;

calculating a representation of the teacher hidden layer outputs of the subset of the plurality of teacher hidden layers mapped to each of the plurality of student hidden layers; and training the student neural model to generate a student output that approximates the plurality of teacher outputs for the training input, wherein each of the plurality of student hidden layers, for each of the training inputs, is trained to generate a student hidden layer output that approximates the representation of the subset of the plurality of teacher hidden layers mapped to the each of the plurality of student hidden layers, wherein the mapping comprises, for each of the student hidden layers, assigning an attention weight ($\epsilon_{pq}$) to the teacher hidden layer outputs of each of the subset of the plurality of teacher hidden layers, wherein each attention weight ($\epsilon_{pq}$) is computed by:

$$\epsilon_{pq} = \frac{e^{\varphi pq}}{\sum_{i=1}^{K} e^{\varphi iq}}$$

where $$\varphi_{pq} = \Phi(T_p(x_i^q), S(x_i^q)); \quad x_i^q \in D_q$$

is an energy score between an inferred output of a $p^{th}$ teacher $T_p$, represented by $$T_p(x_i^q),$$

and an inferred output of a student, represented by $$S(x_i^q),$$

the energy score being indicative of a similarity between the respective inferred outputs, $\varphi_{iq}$ is an energy score between an inferred output of an $i^{th}$ teacher and the inferred output of the student, where is K is a total number of teachers, $$\Phi(T_p(x_i^q), S(x_i^q))$$

is an energy function of the inferred output of $T_p$ and the inferred output of S, training data samples $$\{(x_i^q)\}_{i=1}^{N_q}$$

of training dataset $D_q$ are sent to $T_p$ and S to obtain the respective inferred outputs, where $D_q$ is the training dataset for the K number of teachers, and $N^q$ is a number of training data samples in the training dataset $D_q$ for the $q^{th}$ teacher.

18. The method of claim 17, wherein training the student neural model to generate a student output that approximates the plurality of teacher outputs for the training input further comprises computing a weighted knowledge distillation (KD) loss for each teacher neural model, where the weighted KD loss is computed by:

$$L_{KD}^{*q} = \sum_{p=1}^{p=K} \sum_{x_i^q \in D_q} \epsilon_{pq} L_{KD}(T_p(x_i^q), S(x_i^q))$$

where $$L_{KD}^{*q}$$

is the weighted KD loss, $$T_p(x_i^q)$$

is the inferred output of the $p^{th}$ teacher $T_p$, $$S(x_i^q)$$

is the inferred output of the student S, $L_{KD}$ is a loss function, and $\in_{pq}$ is the weight value of the teacher hidden layers of each $p^{th}$ teacher $T_p$ of the plurality of teacher neural models.

19. The method of claim 17, wherein $$T_p(x_i^q) \text{ and } S(x_i^q)$$

are vectors and the $$\Phi(T_p(x_i^q), S(x_i^q))$$

function is a dot product of the $$T_p(x_i^q)$$

vector and the $$S(x_i^q)$$

vector.

20. The method of claim 17, wherein $$T_p(x_i^q) \text{ and } S(x_i^q)$$

are vectors and the $$\Phi(T_p(x_i^q), S(x_i^q))$$

5 function is a neural network suitable for measuring a simi-
larity of the

10

$$T_p(x_i^q)$$

vector and the

15

$$S(x_i^q)$$

vector.

* * * * *